United States Patent
Yamaguchi

(10) Patent No.: US 8,248,437 B2
(45) Date of Patent: Aug. 21, 2012

(54) IMAGE DISPLAY APPARATUS AND METHOD FOR CONTROLLING THE SAME

(75) Inventor: Hiroichi Yamaguchi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 12/482,849

(22) Filed: Jun. 11, 2009

(65) Prior Publication Data

US 2009/0315887 A1   Dec. 24, 2009

(30) Foreign Application Priority Data

Jun. 18, 2008 (JP) .................................. 2008-159693

(51) Int. Cl.
*G09G 5/00* (2006.01)
*G06T 5/00* (2006.01)

(52) U.S. Cl. ........................................................ 345/633

(58) Field of Classification Search .................. 345/633, 345/545, 558, 560, 9; 348/53
See application file for complete search history.

(56) References Cited

U.S. PATENT DOCUMENTS

| 5,805,618 | A | * | 9/1998 | Shimizu | ........................ 714/771 |
| 6,288,689 | B1 | * | 9/2001 | Shikama | .......................... 345/7 |
| 6,558,006 | B2 | | 5/2003 | Ioka | ................................ 353/94 |
| 2007/0070219 | A1 | * | 3/2007 | Morimoto et al. | ....... 348/231.99 |

FOREIGN PATENT DOCUMENTS

| JP | 6-178244 | 6/1994 |
| JP | 11-326820 | 11/1999 |
| JP | 2002-72359 | 3/2002 |

* cited by examiner

*Primary Examiner* — Jeffery A Brier

(74) *Attorney, Agent, or Firm* — Fitzpatrick, Cella, Harper & Scinto

(57) ABSTRACT

There is provided an image display apparatus which divides an image into plural partial images, each having a region overlapping an adjacent partial image, and displays each of the plurality of partial images on an associated one of a plurality of displays to allow a viewer to view the partial images as a single image. The image display apparatus receives an image signal corresponding to an image to be displayed, stores the received image signal in a buffer on a partial-image-by-partial-image basis, and corrects the image signal so that correction appropriate to an optical system of a display associated with each of the plurality of partial images is applied to the partial image. The speed of the correction processing is changed for each partial image represented by an image signal stored in the buffer to complete the correction of the whole image in a predetermined amount of time.

9 Claims, 20 Drawing Sheets

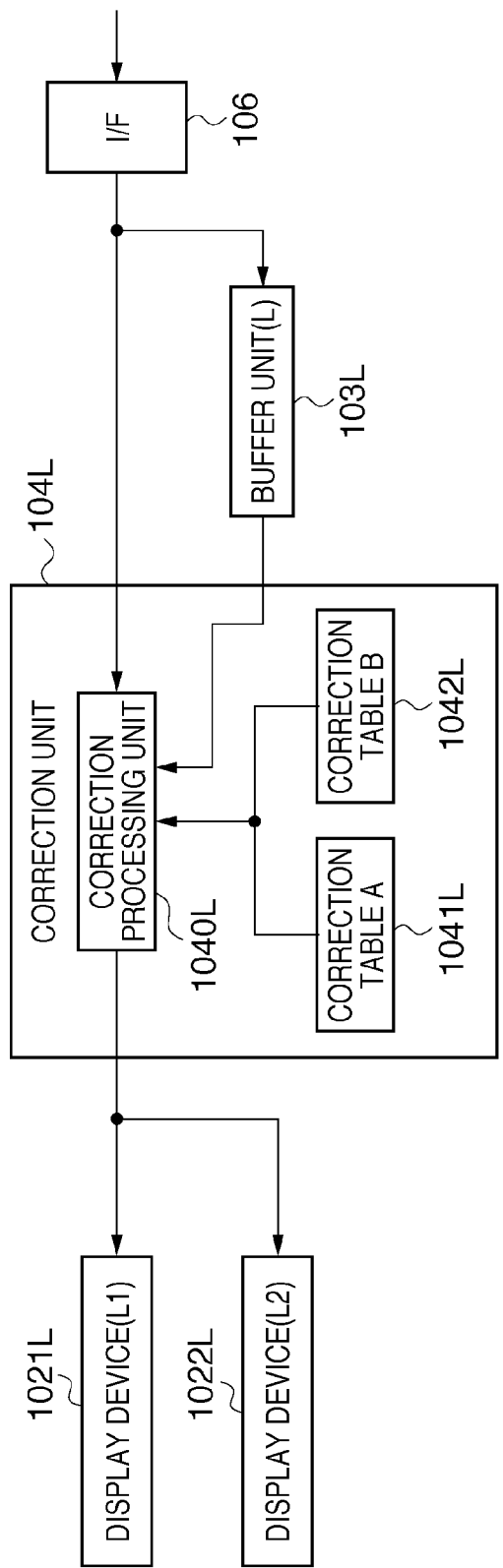
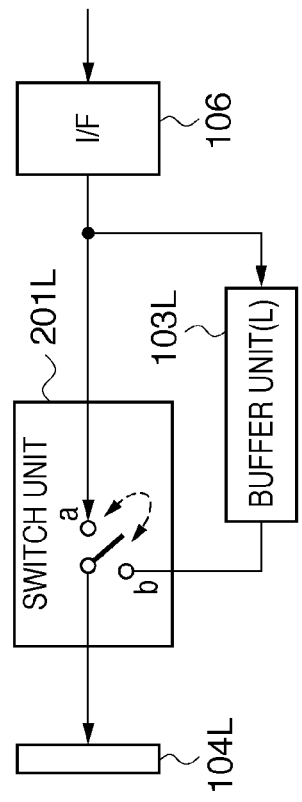

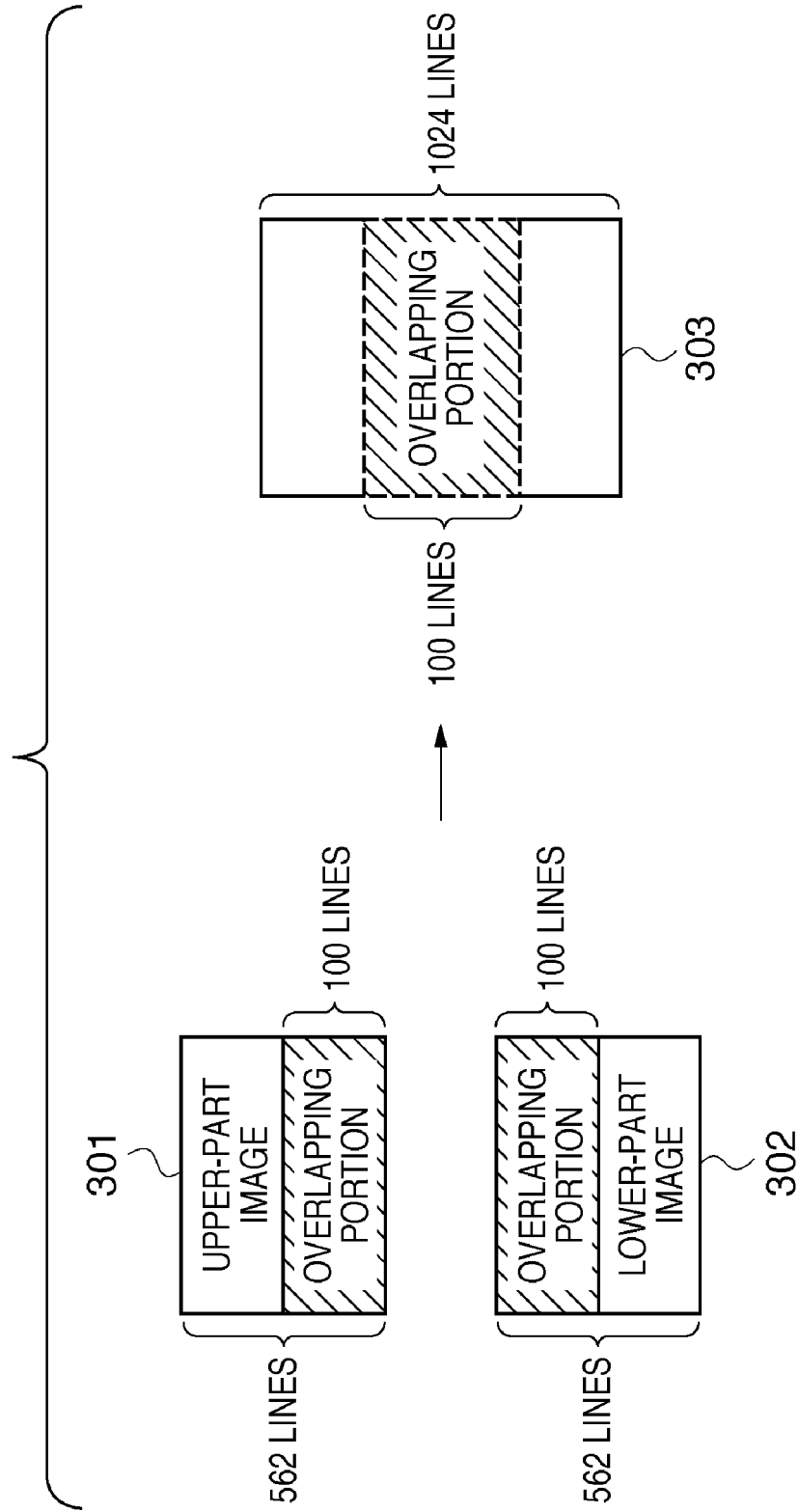

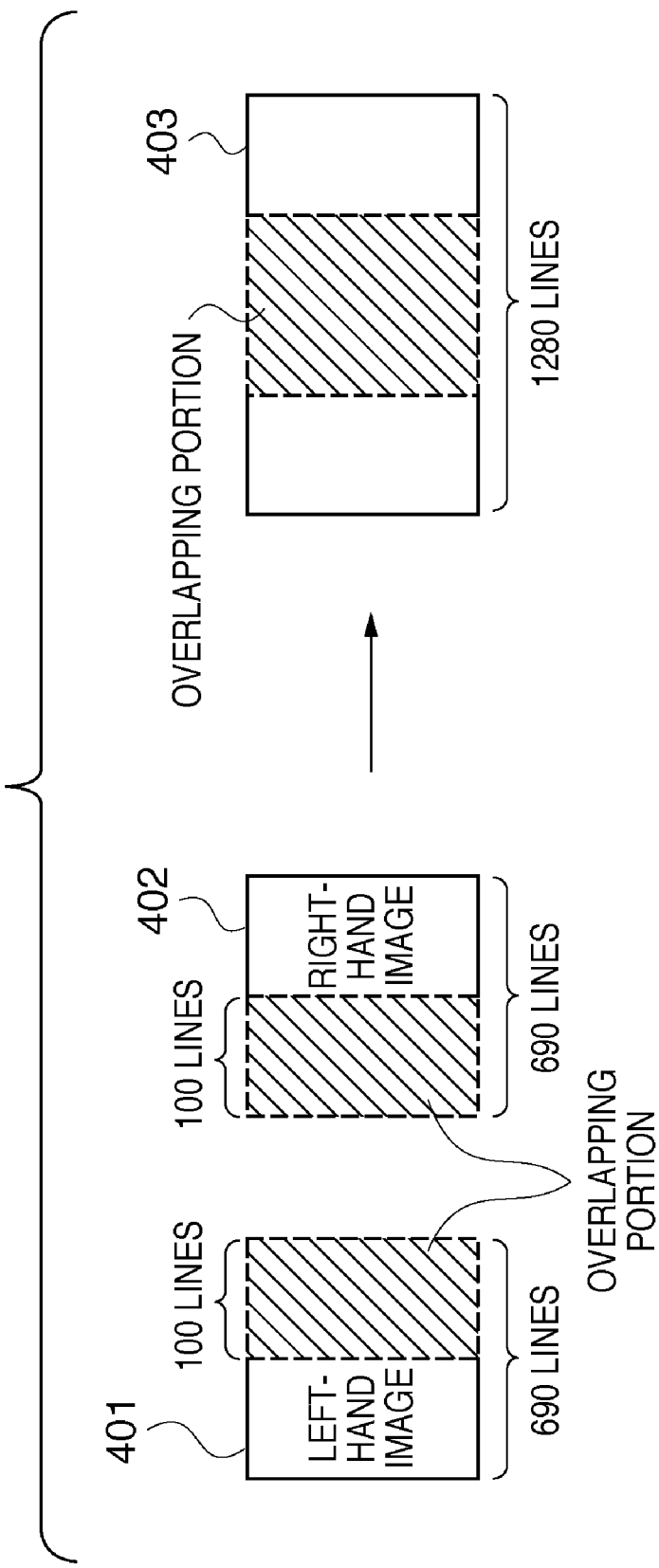

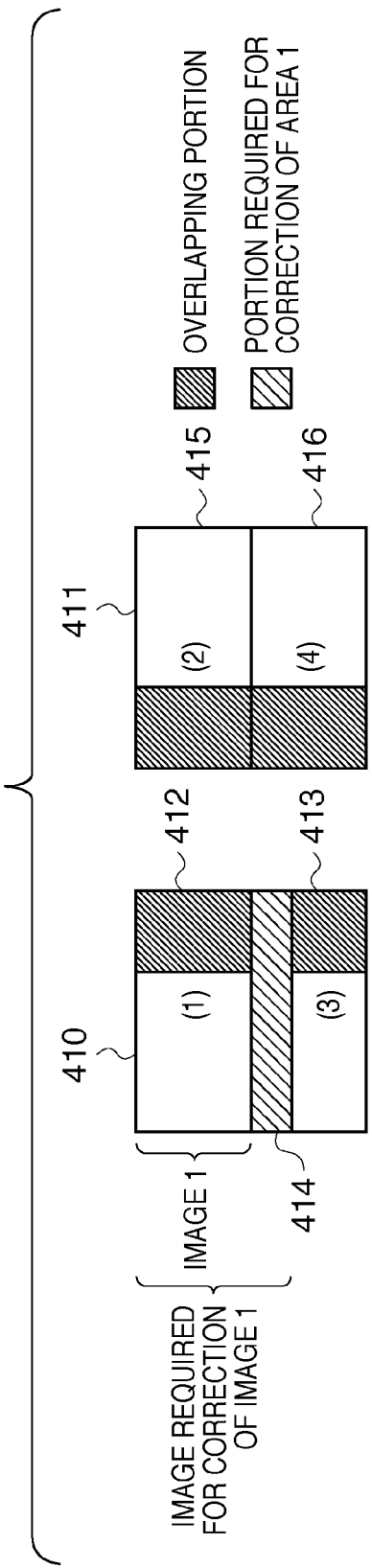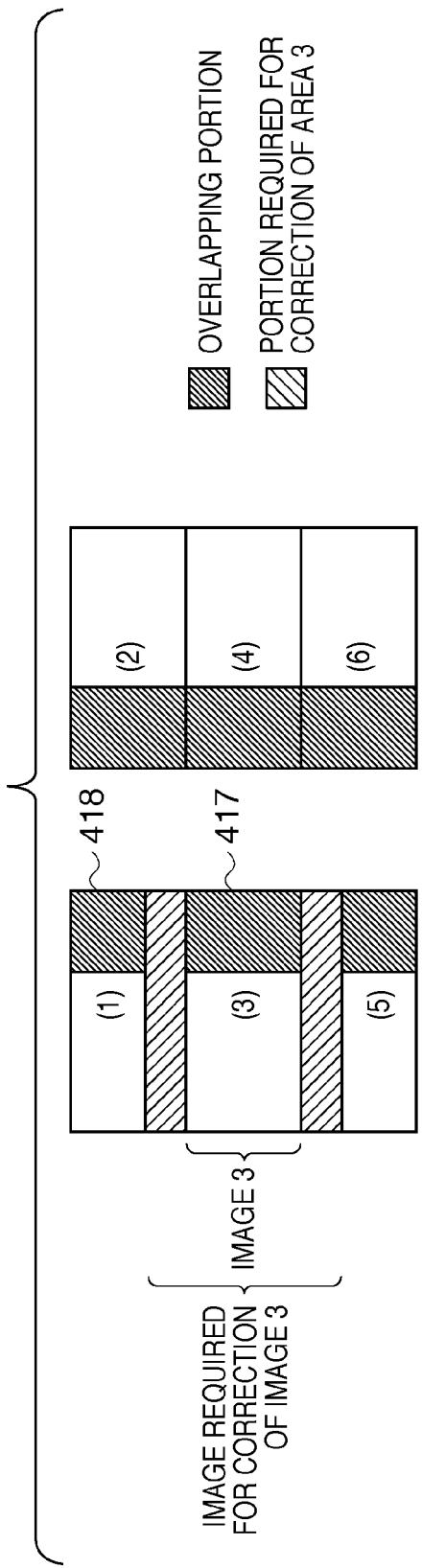

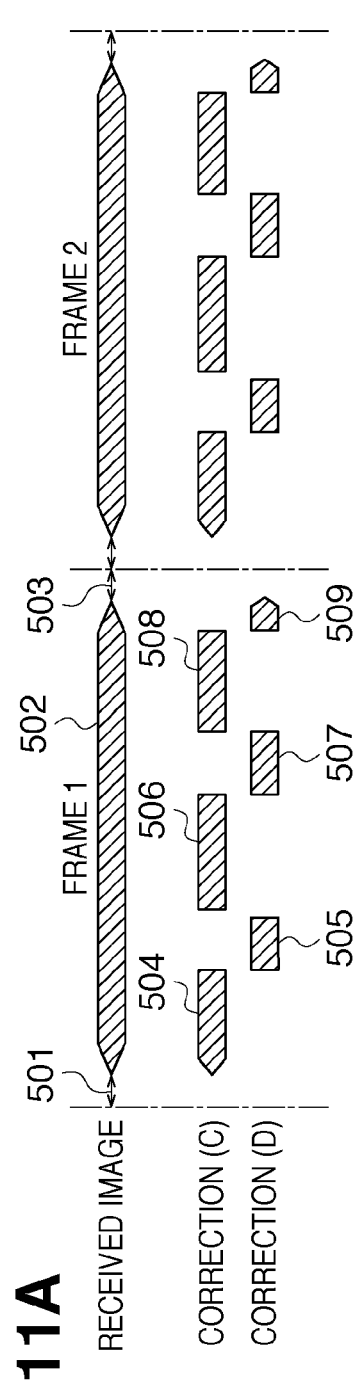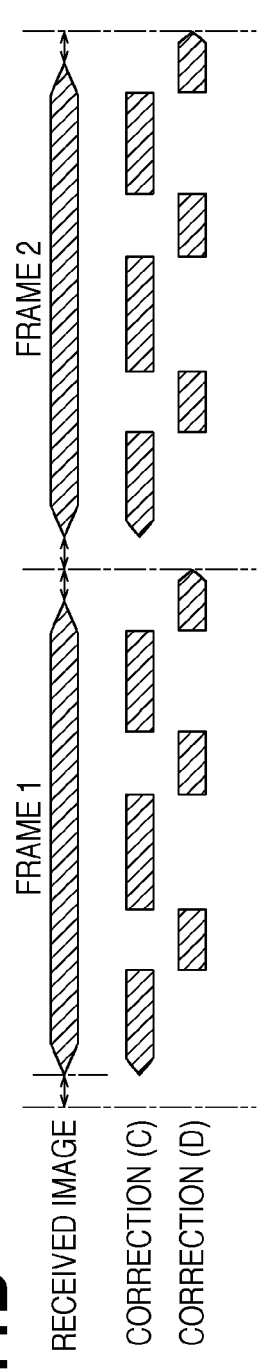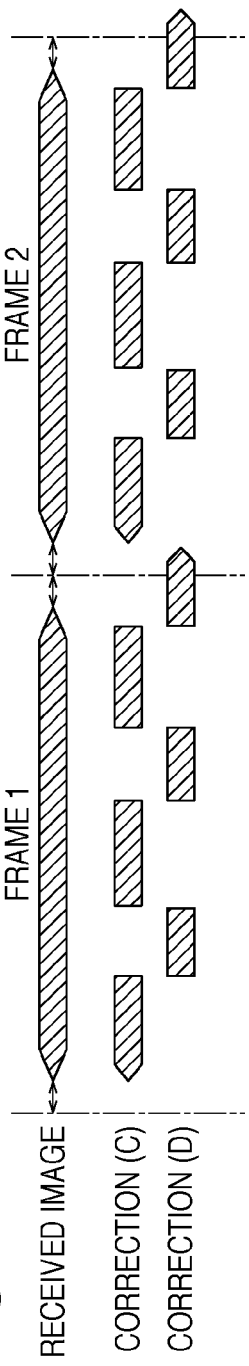

▨ IMAGE SIGNAL OF OVERLAPPING PORTION
▨ IMAGE SIGNAL OF PORTION NOT OVERLAPPING

Prior Art

IMAGE DISPLAY APPARATUS AND METHOD FOR CONTROLLING THE SAME

BACKGROUND OF THE INVENTION

1. Field of the Invention

The present invention relates to an image display apparatus having an optical system which combines original images into one composite image so that the original images displayed on multiple image display devices overlap one another and presents the composite observation image to a viewer and, in particular, to a technique for correcting distortion of the optical system.

2. Description of the Related Art

In recent years, an augmented reality technology or so-called Mixed Reality (MR) technology has become known that seamlessly merges the real and virtual worlds in real time. In the MR and virtual reality technologies, Head Mounted Displays (HMDs) are often used to provide mixed and virtual reality images. For example, one MR technology uses a video see-through HMD to present mixed reality images to a user. Specifically, a subject that is substantially identical to a subject viewed from the location of the pupils of a user of the HMD is captured by a video camera or the like, a CG (Computer Graphics) image is superimposed on the captured image, and the resulting image is displayed so that the user of the HMD can view the image.

FIG. 20 shows an HMD 900 being worn by an HMD user. The HMD 900 allows the HMD user to experience MR space.

An HMD requires an observation optical system capable of image display with a wide angle of view in order to provide a high degree of realism. In addition, an HMD needs to be lightweight and small so as not to cause fatigue to a user wearing the HMD on his/her head. In order to implement a small lightweight observation optical system capable of image display with a wide angle of view, a large single display device is desirable. However, there are few off-the-shelf large display devices that can provide a wide angle of view in a configuration of an observation optical system of a conventional HMD. Therefore, there is an observation optical system that uses multiple off-the-shelf small display devices, which are available in large quantities, each of which displays original images viewed in different fields of view, combines the multiple original images into one, and allows a user to view the resulting image. The image display form using such an observation optical system is called tiling display.

For example, an HMD using an optical device having five curved surfaces has been proposed. This HMD uses a prism having multiple sides to reflect light multiple times to fold the optical path in an optical device in order to minimize the size of the optical system. The optical system has a shape with five sides formed by joining three-sided prisms symmetrically about the visual axis. Image light rays from two display devices are internally reflected multiple times in areas in the prisms to fold the image light rays; image light rays of the halves of the angle of view are separately guided to the eyes through two areas. FIG. 21 is a diagram illustrating the optical system described in Japanese Patent Laid-Open No. 11-326820. The optical system includes first and second display panels 901 and 902 displaying divided images for tiling display and free-form surface prisms 903 and 904 guiding display images of the first and second display panels 901 and 902 to a viewing position.

Since more than one observation optical system, 903 and 904, is provided, distortion which occurs in the observation optical systems 903 and 904 due to differences in quality or in type between the individual observation optical systems 903 and 904 needs to be corrected for each display panel. Japanese Patent Laid-Open No. 06-178244 describes a technique for performing correction for each display panel (or apparatus) by using a correction circuit provided for each display panel. Japanese Patent Laid-Open No. 2002-072359 describes a technique in which a single correction circuit is used to perform correction for multiple display panels.

However, the technique described in Japanese Patent Laid-Open No. 06-178244 requires a correction circuit to be provided for each display panel, making it difficult to reduce the circuit scale.

In the technique described in Japanese Patent Laid-Open No. 2002-072359, before correction is performed for display panels, a whole image is stored in a buffer and then the image is divided into as many partial images as the number of display panels. Correction is then performed for each divided image by using the single correction circuit. Therefore, the method in Japanese Patent Laid-Open No. 2002-072359 incurs high latency between the reception of an image by the HMD and actual display of the image. Especially in MR technology, the latency required for displaying an image on an HMD must be minimized. In this respect, the method described is disadvantageous.

As described above, it is difficult to minimize the circuit scale with the technique described in Japanese Patent Laid-Open No. 06-178244 in which a correction circuit is provided for each display panel. It is difficult to reduce the latency required for displaying an image with the technique described in Japanese Patent Laid-Open No. 2002-072359 because a whole image is temporarily stored in a buffer before the image is divided.

SUMMARY OF THE INVENTION

The present invention has been made in light of the circumstances described above. According to one embodiment of the present invention, there is provided an image display apparatus and a method for controlling the image display apparatus that enable multiple images into which an image is divided to be corrected with a common correction circuit and reduce the latency required for displaying the images.

According to one aspect of the present invention, there is provided an image display apparatus which divides an image into a plurality of partial images, each having a region overlapping an adjacent partial image, and displays each of the plurality of partial images on an associated one of a plurality of displays to allow a viewer to view the partial images displayed on the plurality of displays as a single image, the image display apparatus comprising:

a reception unit configured to receive an image signal corresponding to the image;

a storage unit configured to store the image signal received by the reception unit in a buffer on a partial-image-by-partial-image basis;

a correction unit configured to correct the image signal so that correction appropriate to an optical system of a display associated with each of the plurality of partial images is applied to the partial image; and a control unit configured to change the speed of correction processing performed by the correction unit for each partial image represented by an image signal stored in the buffer.

According to another aspect of the present invention, there is provided an image display apparatus which divides an original image into a plurality of partial images, each having a region overlapping an adjacent partial image, and displays each of the plurality of partial images on an appropriate one of a plurality of displays to allow a viewer to view the partial images displayed on the plurality of displays as a single image, the image display apparatus comprising:

a reception unit configured to receive the original image;

a first conversion unit configured to convert a resolution of the received original image so that the total number of lines of a plurality of partial images obtained from the original image becomes equal to the total number of lines of the original image;

a correction unit configured to perform correction processing to apply correction to each of a plurality of partial images obtained from an image whose resolution has been converted by the first conversion unit, the correction being appropriate to an optical system of a display associated with the partial image;

a second conversion unit configured to convert the resolution of each of the plurality of partial images corrected by the correction unit so that the total number of lines of the plurality of partial images corrected becomes equal to the total number of lines of a plurality of partial images obtained from the original image; and a display unit configured to display the plurality of partial images whose resolution has been converted by the second conversion on the plurality of displays.

Further features of the present invention will become apparent from the following description of exemplary embodiments with reference to the attached drawings.

BRIEF DESCRIPTION OF THE DRAWINGS

FIGS. 2A and 2B are block diagrams showing configurations of a correction unit and surrounding components according to the first embodiment;

FIG. 3 shows how a display image is divided according to the first embodiment;

FIG. 8 shows how a display image is divided according to the second embodiment;

FIGS. 9A and 9B are diagrams illustrating units of correction according to the second embodiment;

FIGS. 11A to 11C are timing charts of image reception and correction processing according to the second embodiment;

DESCRIPTION OF THE EMBODIMENTS

The present invention will be described below in detail according to preferred embodiments with reference to the accompanying drawings.

First Embodiment

A method for correcting images to be displayed on display devices providing a tiling display using divided view angles in an HMD having a tiling optical system will be described with respect to a first embodiment. In a tiling optical system, an image is divided into multiple partial images, each having a region overlapping an adjacent partial image, and each of the multiple partial images is then displayed on one of display units as described above. Next, the multiple partial images displayed on the multiple display units are presented to a viewer so that the partial images appear as a single image to the viewer. It is assumed in the first embodiment that an image is divided into upper and lower partial images by two display devices to allow tiling display. That is, the partial images are adjacent to one another in the vertical direction.

Figure 1:
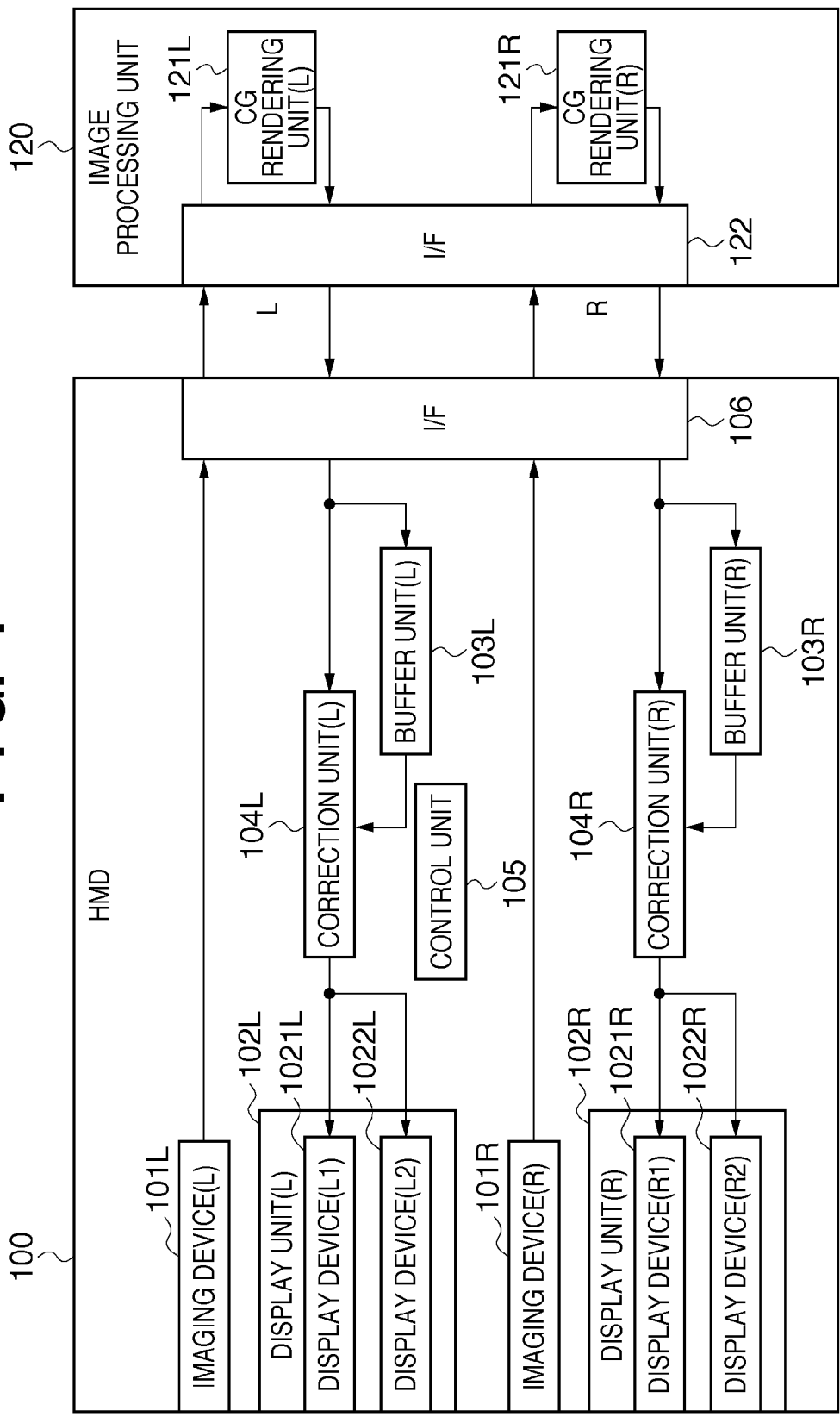
FIG. 1 is a block diagram showing a system configuration of a head mounted image display apparatus (video see-through HMD) according to a first embodiment.

FIG. 1 is a block diagram showing a system configuration of a head mounted image display apparatus (video see-through HMD) according to the first embodiment. The HMD 100 according to the first embodiment provides tiling display and yet requires only one correction unit per eye and is capable of displaying images with a low latency.

The HMD 100 includes imaging devices 101L and 101R capturing images to be displayed on the HMD, display units 102L and 102R displaying composite images into which captured images and CG images are combined, and transmitting and receiving interface (I/F) 106 for transmitting and receiving images and signals. Specifically, the transmitting and receiving I/F 106 receives image signals corresponding to images to be displayed. The HMD 100 also includes buffer units 103L and 103R, each storing a part of an image received through the transmitting and receiving I/F 106, and correction units 104L and 104R performing correction for displaying received images. For example, each of the correction units 104L and 104R performs correction including at least one of distortion correction and chromatic aberration correction. The HMD 100 further includes a control unit 105 which controls the components described above. The display unit 102L includes display devices 1021L and 1022L. The display devices 1021L and 1022L display the upper and lower halves, respectively, of an image viewed by the left eye of a user of the HMD 100. Similarly, the display unit 102R includes display devices 1021R and 1022R and the display devices 1021R and 1022R display the upper and lower halves, respectively, of the image viewed by the right eye of the user of the HMD 100.

The HMD 100 has separate functions of processing images for the left and right eyes. In FIG. 1, the components for the left and right eyes that have the same function are labeled with the same reference numerals with appended symbols L and R, respectively. When components do not need to be distinguished between the left and right eyes in the following description, only reference numerals will be used without symbols L and R.

Images displayed on the display devices 1021, 1022 are guided to the eyes of the user of the HMD 100 through an optical system. If images received were directly displayed on the display devices, the images distorted by the optical system would be viewed by the user of the HMD 100. To prevent this, the correction unit 104 performs correction so that the viewer can view the images passing through the optical system without distortion.

An image processing unit 120 is implemented by a personal computer or workstation. In the image processing unit 120, a transmitting and receiving I/F 122 receives a digital image signal from an imaging system (imaging devices 101) of the HMD 100 and transmits a digital image signal and a data signal to the HMD 100. CG rendering units 121L and 121R combine received captured images with CG images to generate MR images.

The HMD 100 transmits images captured by the imaging devices 101L and 101R to the image processing unit 120 through the transmitting and receiving I/F 106. In the image processing unit 120, the CG rendering units 121L and 121R combine CG images with received captured images and transmit the combined images to the HMD 100. In the HMD 100, the images received from the image processing unit 120 are displayed on the display units 102. Consequently, the user of the HMD 100 can view the composite images which are combinations of images captured in real time and CG images superimposed on them.

With the configuration described above, the user wearing the video see-through HMD can experience a mixed reality world in which the real world is seamlessly merged with a virtual world in real time.

FIG. 3 is a diagram illustrating images displayed on the display devices and an image that the user of the HMD 100 can view in the present embodiment. An upper image 301 is displayed on the upper display device 1021 by using 562 lines in the vertical direction. A lower image 302 is displayed on the lower display device 1022 by using 562 lines in the vertical direction. One hundred of lines of the lines in each of the images 301 and 302 display the same image. That is, the same image would be displayed on the 100 lines on each display device when optical system correction is not performed. An image after passing through the optical system is viewed by the user of the HMD 100 as an image consisting of 1024 lines in the vertical direction like the image 303.

The present embodiment is described with respect to an example in which images are evenly divided in the vertical direction as shown in FIG. 3. However, the image does not necessarily need to be evenly divided. If the image is not evenly divided, upper and lower images will coexist on one line. However, since the line is in the region processed as an overlapping portion, the same process as described below can be applied without any problem.

Since light passes through different optical systems for display devices 1021 and 1022, different corrections need to be applied to the image 301 to be displayed on the display device 1021 and the image 302 to be displayed on the display device 1022. FIG. 2A is a block diagram showing in detail the correction unit 104L and components near the correction unit 104L in the HMD 100. The correction unit 104L includes a correction processing unit 1040L which performs correction, a correction table A 1041L required for displaying an image on the display device 1021L, and a correction table B 1042L required for displaying an image on the display device 1022L. While the correction tables are provided in the correction unit 104L in the present embodiment, the correction tables may be in a memory outside the correction unit 104L. A configuration of a correction system for the left eye is shown in FIG. 2A. The correction system for the right eye has the same configuration.

An image correction process in the present embodiment will be described with reference to a flowchart shown in FIG. 4. The term upper image as used in the description of the present embodiment refers to the image including the upper-part image of the image 301 and an overlapping portion of the image 301 in FIG. 3 (the upper-part image is the upper image 301 excluding the overlapping portion). The term lower image as used in the description refers to the image including the lower-part image of the image 302 and an overlapping portion of the image 302 in FIG. 3 (the lower-part image is the lower image 302 excluding the overlapping portion).

Figure 4:
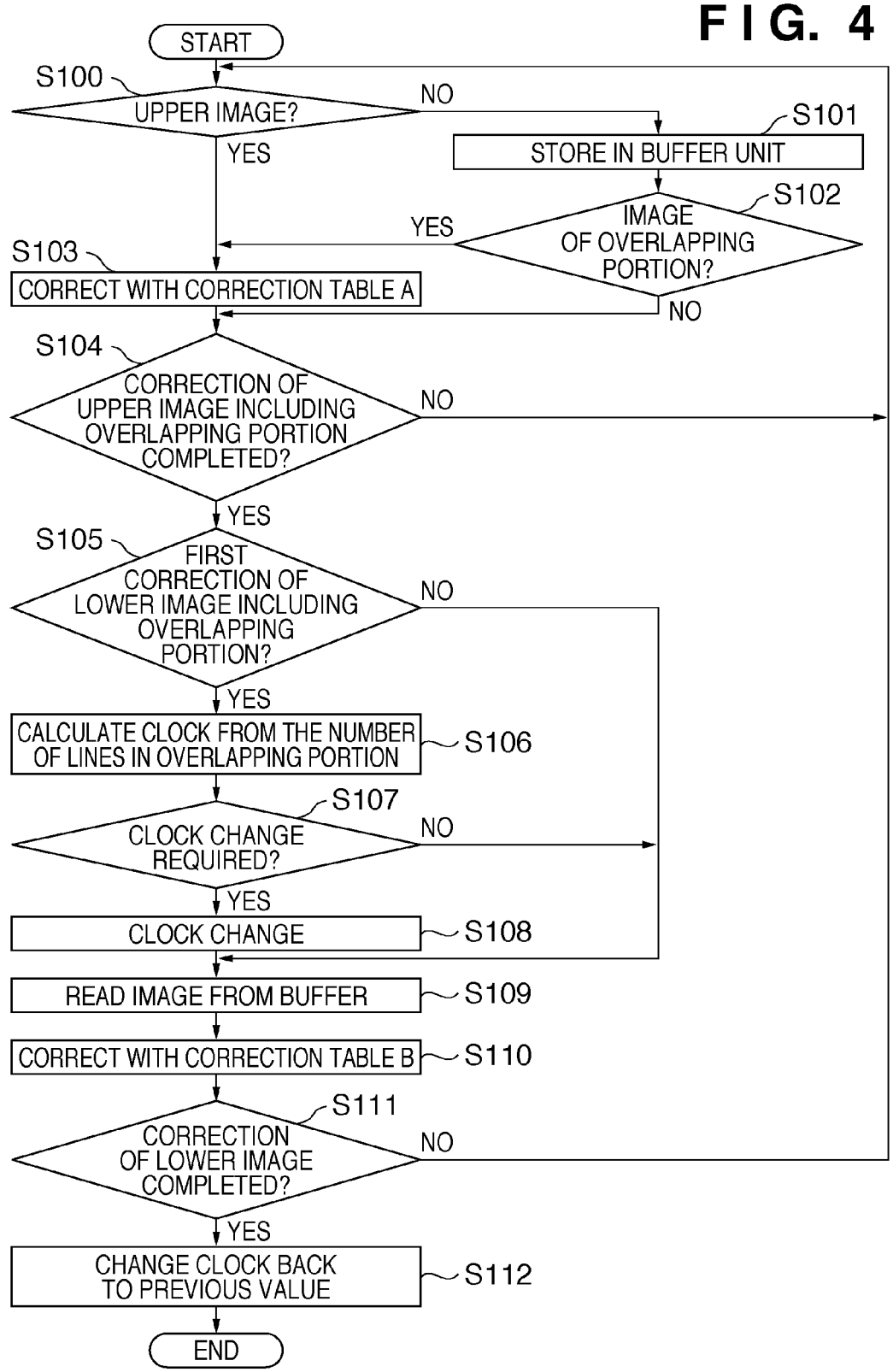
FIG. 4 is a flowchart illustrating a correction process according to the first embodiment.

The process shown in the flowchart of FIG. 4 starts upon reception of one frame of the moving image and is performed line by line of an image signal. While the process will be described below with respect to the display system for the left eye, the same process is performed in the display system for the right eye. First, the control unit 105 determines in step S100 whether received image data is on a line to be displayed in the upper-part image of the upper image 301. If the image data is on a line in the upper-part image, the correction processing unit 1040L corrects the image on the basis of the correction table A 1041L under the control of the control unit 105 in step S103.

If the control unit 105 determines in step S100 that the image data is not on a line in the upper-part image, the control unit 105 stores in step S101 the received image line signal in the buffer unit 103L. Next, the control unit 105 determines in step S102 whether the received image data is of the image in an overlapping portion. That is, the control unit 105 determines whether the image data represents the image in an overlapping portion of the image 301. If it is determined in step S102 that the image data represents the image in the overlapping portion, the correction processing unit 1040L corrects the image on the basis of the correction table A 1041L under the control of the control unit 105 in step S103. If it is determined in step S102 that the image data does not represent the image in the overlapping portion, the process directly proceeds to step S104. Correction processing of the lower image 302 is performed in step S105 and the subsequent steps. It is assumed here that signals corresponding to the lower-part image received will continue to be stored in the buffer unit 103L.

In the process described above, a partial image to be displayed on the lower display device 1022L is held in the buffer unit 103L. The concept is that received image signals are buffered on a partial-image-by-partial-image basis except for the first partial image (upper image) in a sequence of image signals received through the transmitting and receiving I/F 106. Correction processing is applied to the first partial image in synchronization with the reception of the signal in the first embodiment (step S103). Therefore, buffering for the upper partial image is omitted. That is, the image signals corresponding to the second and subsequent partial images are buffered on a partial-image-by-partial-image basis and only the lower image is held in the buffer in the first embodiment.

In step S104, the control unit 105 determines whether correction of the image 301 (the upper image including the overlapping portion) has been completed. That is, determination is made as to whether correction of the image to be displayed on the display device 1021L has been completed. If it is determined that correction of the upper image has not been completed, the process returns to step S100. On the other hand, if correction of the upper image has been completed, the process in step S105 and subsequent steps is performed.

In step S105, the control unit 105 determines whether correction of the lower image including the overlapping portion is performed for the first time for the image within one frame. If it is not the first time, the process proceeds to step S109; if it is the first time, steps S106 through S108 are performed. In step S106, the control unit 105 calculates the processing clock frequency (clock speed) required for completing the correction by the end of one frame image in the moving image from the format of the image received and the number of the lines in the overlapping portion in the vertical direction. While the calculation is performed frame by frame of the moving image in the flowchart shown, the embodiment is not so limited. For example, the clock speed may be read from a table, or may be determined during communication negotiation with the image processing unit 120, or may be determined when an image of a different image format is received from the image processing unit 120. In step S107, the control unit 105 compares the current clock speed with the clock speed calculated in step S106 to determine whether the current clock speed needs to be changed. Here, if [current clock speed]<[clock speed calculated in step S106], it is determined that the current clock speed needs to be changed. In the following description, changing the clock speed is sometimes simply referred to as changing the clock. If the control unit 105 determines that the clock needs to be changed, the control unit 105 in step S108 changes the clock speed for operation between the buffer unit 103L and the display device 1022L to the clock speed calculated in step S106. In particular, the clock speed for operation at the correction unit 104L and the display device 1022L, operation between the correction unit 104L and the display device 1022L, and operation between the correction unit 104L and the buffer unit 103L is changed.

Figure 5A:
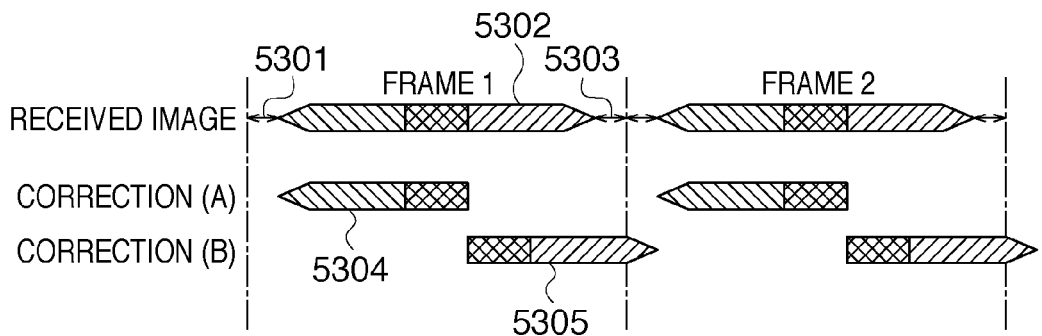
FIGS. 5A to 5D are timing charts of image reception and correction processing according to the first embodiment.

The reason why the clock speed needs to be changed according to the number of lines in the overlapping portion will be described below with reference to FIGS. 5A through 5D. FIG. 5A is a timing chart of images received and images to be corrected. Reference numeral 5302 represents an image signal of one frame received. There are time periods during which no image is received, namely a front porch 5301 before an image is received, and a back porch 5303 after the end of reception of the image. For example, when an SXGA (1280× 1024 pixels) is received with 60 Hz, there is a time period equivalent to 1 line in the front porch 5301 and a time period equivalent to 38 lines in the back porch 5303. The image in the overlapping portion needs to be subjected to two corrections: one for displaying the image on the display device 1021L and one for displaying the image on the display device 1022L. In addition, there are periods where different corrections are applied to the same image area. Because of these time periods, the timing charts as shown in CORRECTION (A) and CORRECTION (B) in FIG. 5A result. As shown, the time required for correction processing (5304 and 5305) exceeds the time in which the image of one frame (5302) is received. Correction processing on the image of one frame needs to be completed by the start of reception of the next image. Therefore, depending on the number of lines in an overlapping portion, the speed of correction processing for displaying the image on the display device 1022L needs to be increased. The control unit 105 changes the speed of correction processing by the correction unit 104L for each partial image represented by the image signal held in the buffer so that the correction processing can be completed within a predetermined time period.

Returning to FIG. 4, the rest of the process will be described. In step S109, the correction unit 104L reads the image from the buffer unit 103L under the control of the control unit 105. In step S110, the correction processing unit 1040L refers to the correction table B 1042L and corrects the image read from the buffer unit 103L under the control of the control unit 105. If correction of the lower image has not been completed in step S111, the process returns to step S100. If correction of the lower image has been completed, that is, correction of the image of one frame has been completed, the process proceeds to step S112. In step S112, the control unit 105 changes the clock speed changed in step S108 back to the previous clock speed. It should be noted that the correction processing unit 1040L switches correction tables in steps S103 and S110 to correct the image signals so that corrections appropriate to the optical systems of the display units are applied to each of the partial images.

Figure 5B:
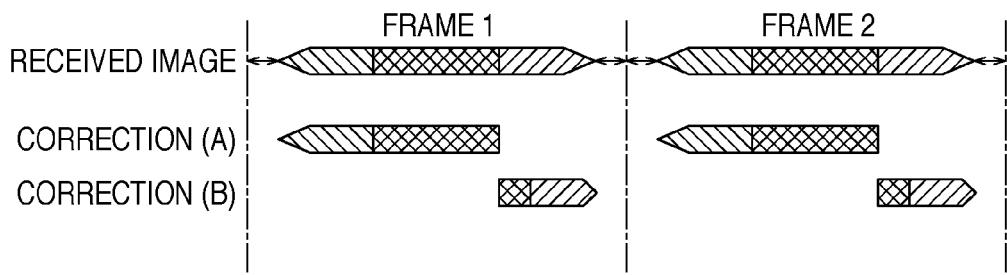
Figure 5C:
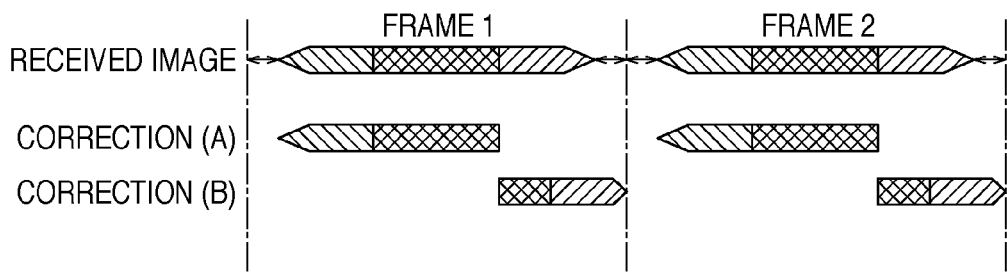
Figure 5D:
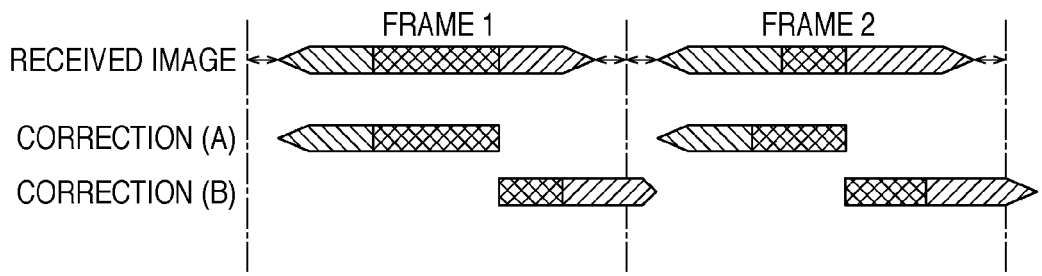

Since the overlapping portions in the example shown in FIG. 5A are small, the correction processing can be completed in time by using the front and back porches 5301 and 5303 without having to change the clock after the switching of correction processing. In contrast, the overlapping portions in the examples in FIGS. 5B to 5D are large and therefore correction processing cannot be completed in time by using the front and back porches after the switching of correction processing unless the clock speed is changed. FIG. 5B shows an example in which the clock is changed in step S108 of FIG. 4 so that correction processing (5304 and 5305) is completed approximately at the end of reception of the image of one frame (5302). FIG. 5C shows an example in which the clock is changed so that correction processing (5304 and 5305) is completed by the end of a back porch 5303. FIG. 5D shows an example in which the clock is changed so that correction processing (5304 and 5305) is completed by the end of the front porch of the next frame. In the examples in FIGS. 5B to 5D, the clock is increased when correction is applied to a lower image including an overlapping portion so that the correction processing is completed before the next frame is received. The processing speed is changed in step S108 of the flowchart in FIG. 4 so that the correction process is completed by the end of the front porch of the next frame (by the time the image of the next frame is received). Therefore, any of the timings in FIGS. 5B to 5D may be used.

As has been described, the buffer unit 103L in the present embodiment acts like a FIFO (First-In-First-Out) line buffer which holds one line of an image while another is being read out. The correction unit 104L reads the image from the buffer unit 103L in the present embodiment. A switch unit 201L shown in FIG. 2B may be used to connect the correction unit 104L to position "a" when the correction unit 104L performs correction processing of the upper image 301 and to position "b" when the correction unit 104L performs correction processing of the lower image 302.

As described above, a buffer is provided before the correction unit which corrects an image and the clock speed is changed depending on the width of the overlapping portion so that correction processing is completed before the image of the next frame is received in the first embodiment. Therefore, one correction unit suffices for one eye and images can be displayed with low latency.

Second Embodiment

A correction method has been described in the first embodiment for a tiling optical system in which a display is divided into upper and lower parts. In a second embodiment, a correction method for a tiling optical system in which a display is divided into left and right parts will be described. In the second embodiment, partial images are adjacent to each other in the horizontal direction.

Figure 6:
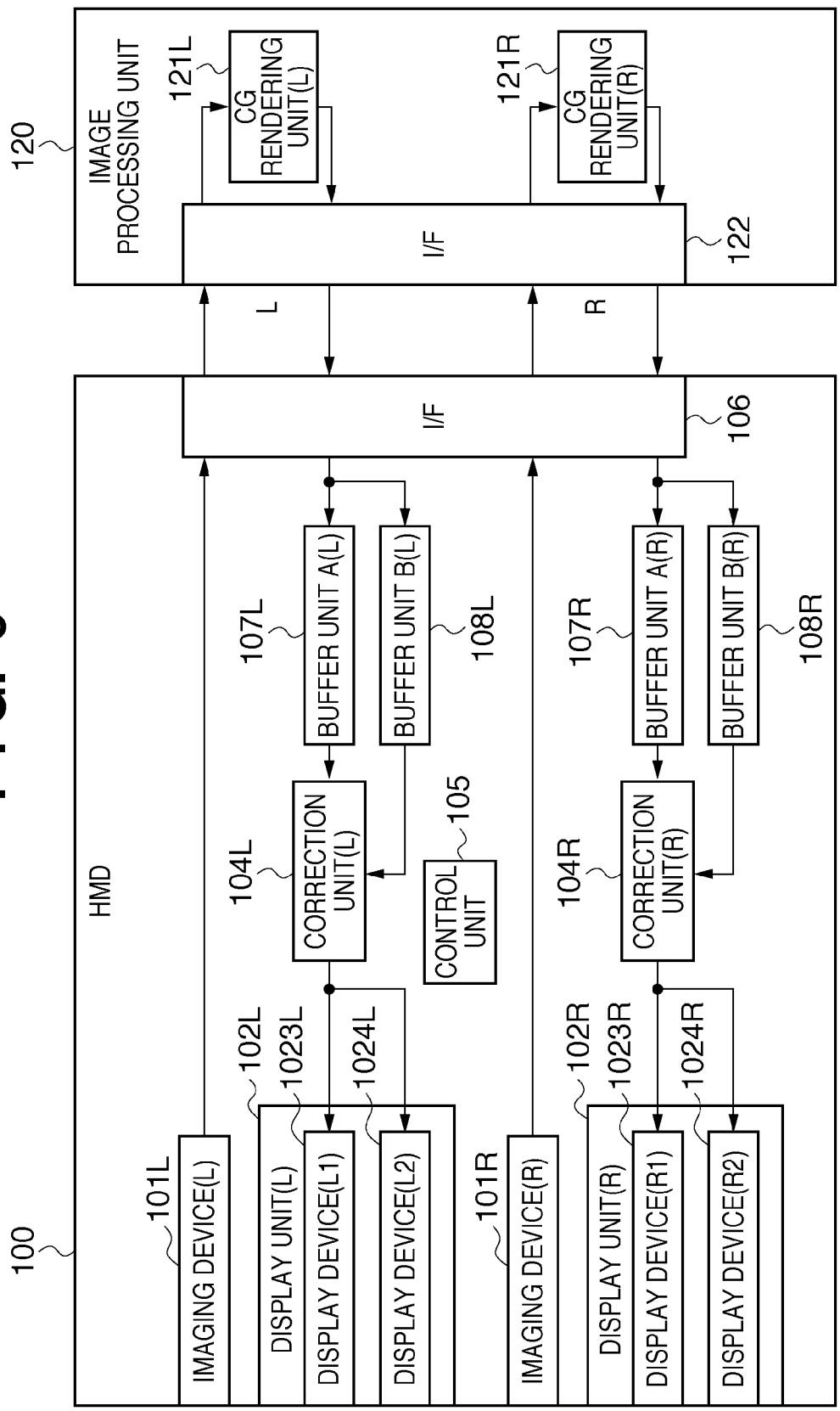
FIG. 6 is a block diagram showing a system configuration of a head mounted image display apparatus (video see-through HMD) according to a second embodiment.
Figure 7:
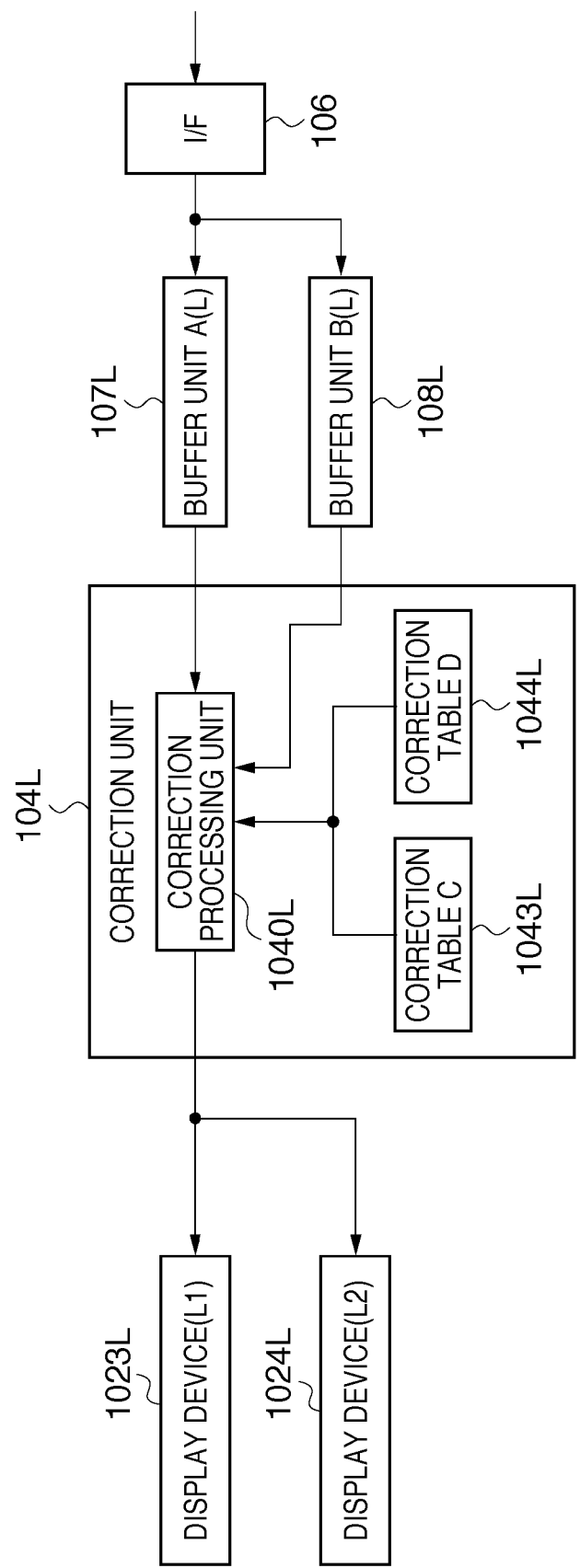
FIG. 7 is a block diagram showing a configuration of a correction unit and surrounding components according to the second embodiment.

FIG. 6 is a functional block diagram showing a system configuration of a head mounted image processing apparatus in the second embodiment. Comparing to FIG. 1, buffer units A 107 and B 108 are provided in FIG. 6 in place of the buffer units 103 in FIG. 1. Display devices 1023 and 1024 are provided in each of display units 102, each displaying left and right divided images. FIG. 7 is a block diagram showing in detail a configuration of a correction unit 104L and the previous and subsequent stages in the HMD 100. Comparing to FIG. 2A, the correction unit 104L includes a correction table C 1043L for display on a display device 1023L and a correction table D 1044L for display on a display device 1024L. The system for display unit 102L for the left eye is shown in FIG. 7. The system for a display unit 102R for the right eye has the same configuration.

FIG. 8 shows an exemplary image displayed on each display device and an image viewed by a user of the HMD 100 in the second embodiment. The left image 401 is displayed on the display device 1023 and the right image 402 is displayed on the display device 1024. The images 401 and 402 have an overlapping portion consisting of 100 lines. The user of the HMD 100 views the images as an image 403 of 1280 lines in the horizontal direction. While the image is evenly divided into left and right in FIG. 8, the image may be unevenly divided. In that case, there will be vertical lines on which left and right images coexist. However, such lines do not affect the process described below at all because the lines belong to an overlapping potion.

If the entire left image of one frame is corrected and then the entire right image is corrected and for display, the latency for displaying the images will be high. Therefore, an image is separated into blocks and correction processing is performed block by block in the second embodiment. FIGS. 9A and 9B show exemplary orders in which images are corrected in the second embodiment. An image 410 in FIG. 9A is to be displayed on the display device 1023 and an image 411 is to be displayed on the display device 1024. In the example in FIG. 9A, the image is divided into four blocks (sub-regions). The image 412 is the upper half of the image 410 and the image 413 is the lower half. That is, one partial image is subdivided into two sub-regions. Similarly, the image 415 is the upper half of the image 411 and the image 416 is the lower half. In the second embodiment, correction is applied to the images 412, 415, 413 and 416 in this order.

That is, in the second embodiment, each of multiple partial images is further divided into sub-regions (blocks) having a portion overlapping an adjacent sub-region and correction processing is performed on each of the sub-regions. The order in which the sub-regions are corrected corresponds to the order in which image signals have been received through the transmitting and receiving I/F 106.

When the image 412 is corrected, a portion of the image 413 may be required for correction of the boundary region between the images 412 and 413. In the example in FIG. 9A, the image 414 is the required portion. FIG. 9B shows image areas required for correcting an image 417 in an example in which an image is divided into six blocks. When a display device is divided in the horizontal direction in this way and images are displayed on the display device, an area larger than an area to be corrected may be required for the correction.

An image is received frame by frame. Accordingly, the images 414 and 416 are received while correction processing is being performed on the image 415 in FIG. 9A. In doing this, the image 414 is stored in the buffer unit A 107 and the image 416 is stored in the buffer unit B 108.

Image correction processing in the second embodiment will be described with reference to a flowchart shown in FIG. 10. The term left image as used in the following description refers to the image including the left-hand image of the image 401 and an overlapping portion in FIG. 8 (the left-hand image is the left image 401 excluding the overlapping portion). The term right image refers to the image including the right-hand image of the image 402 and an overlapping portion in FIG. 8 (the right-hand image is the right image 402 excluding the overlapping portion). Operation of a display system for the left eye will be described below. The same operation is performed by a display system for the right eye.

Figure 10:
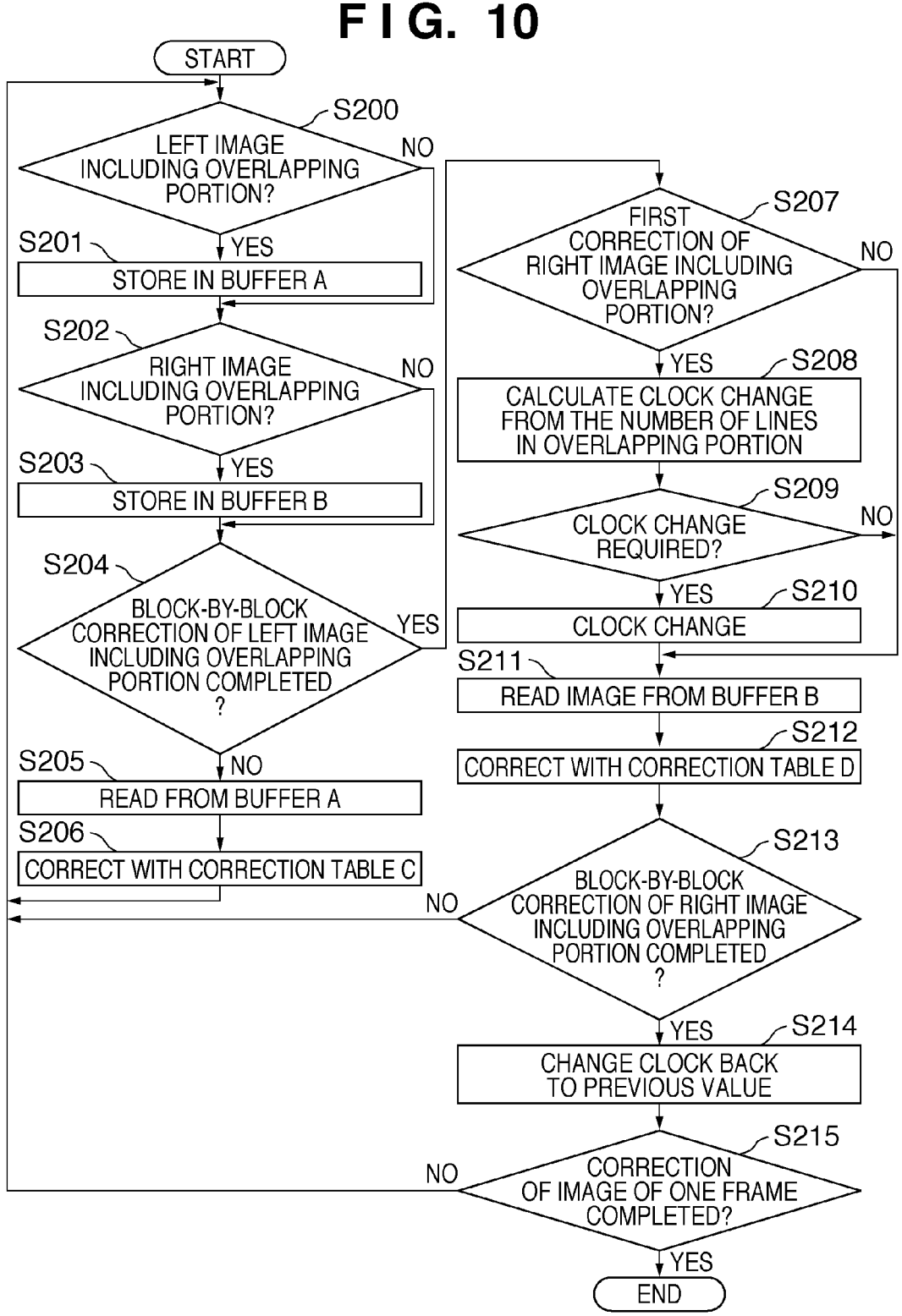
FIG. 10 is a flowchart illustrating a correction process according to the second embodiment.

The process of the flowchart in FIG. 10 starts upon reception of the image of one frame. First, the control unit 105 determines in step S200 whether the received image is a left image including an overlapping portion. If the image is a left image, the control unit 105 stores the image in a buffer unit A 107L in step S201. In step S202, the control unit 105 determines whether the received image is a right image including an overlapping portion. If the image is a right image, the control unit 105 stores the image in a buffer unit B 108L in step S203.

In step S204, the control unit 105 determines whether block-by-block correction processing of the left image has been completed. If not, the correction unit 104L reads the image from the buffer unit A 107L under the control of the control unit 105 in step S205 and the correction processing unit 1040L refers to the correction table C 1043 to correct the image in step S206. When the image is read from the buffer unit A 107L in step S205, all images required for correction are read. For example, when the image 412 in FIG. 9A to be corrected and the boundary-area adjacent to the upper-block image are corrected, the image 412 to be corrected and the image 414 are read and corrected. When the upper boundary area of the image 417 shown in FIG. 9B is to be corrected, the image 418 is read in addition to the image 417 to be corrected.

If it is determined in step S204 that block-by-block correction processing of the left image has been completed, a clock speed changing process in steps S207 through S210 is performed. The clock changing process in steps S207 through S210 is the same as the clock changing process (steps S105 through S108) in FIG. 4 of the first embodiment and therefore its description will be omitted.

To determine the clock speed, the time to be allocated to correction processing of a block to process can be determined as described below. For example, when a normal clock speed is used for the left image, processing time for each block of the right image can be determined by:

subtracting the time used for processing of the left image from the processing time allocated to one frame; and dividing the remaining processing time by the number of blocks of the right image.

In step S211, the correction unit 104L reads the image from the buffer unit B 108L under the control of the control unit 105. In step S212, the correction processing unit 1040L corrects the image by using the correction table D 1044L. As in step S205, when the correction unit 104L reads the image from the buffer unit B 108L, the correction unit 104L reads all image data required for the correction. In step S213, the control unit 105 determines whether block-by-block correction of the right image including the overlapping portion has been completed. If the control unit 105 determines that correction of the right image has been completed, the control unit 105 changes the clock changed in step S210 back to the previous clock in step S214. While the correction unit 104L reads the image from the buffer units A 107L and B 108L in the second embodiment, the embodiment is not limited to this. It will be apparent that a switch unit 201L shown in FIG. 2B may be used to switch access between the buffer units A and B, for example. In step S215, determination is made as to whether correction of the image of one frame has been completed. If not, the process returns to step S200. If completed, the process will end.

As in the first embodiment, the clock speed is changed so that the correction processing is completed by the end of the front porch of the next frame.

FIGS. 11A through 11C are timing charts showing timings of image reception and correction processing according to the process flow of the second embodiment. In the examples shown in FIGS. 11A through 11C, an image is divided into three blocks in the vertical direction as shown in FIG. 9B and the clock speed for correction processing of the right image is increased. In FIGS. 11A through 11C, reference numeral 502 indicates one frame of a received image, reference numeral 501 indicates a front porch, and reference numeral 503 indicates a back porch. Reference numerals 504, 506, and 508 represent correction processing of a left image including an overlapping portion. Reference numerals 505, 507, and 509 represent correction processing of a right image including an overlapping portion. Since the clock speed for the correction processing of the right image is higher, the processing time for the correction processing 505, 507, and 509 is shorter. In the example in FIG. 11A, the clock speed is changed so that the correction processing (504 to 509) ends approximately at the end of reception of the image of one frame image (502). In FIG. 11B, the clock speed is changed so that the correction processing (504 to 509) ends by the end of the back porch 503. In FIG. 11C, the clock speed is changed so that the correction processing (504 to 509) ends by the end of the front porch of the next frame. In these examples, the correction processing speed is changed so that the correction processing on all partial images ends by the time the image of the next frame is received.

As has been described above, buffers are provided before correction units which correct images and images are divided into blocks in the vertical direction in the second embodiment. This configuration requires only one correction unit per eye even for an optical system that divides an image between left and right and can display images with low latency.

Third Embodiment

In the first and second embodiments, a tiling optical system is used that divides a display into upper and lower or left and right parts. In the third embodiment, a correction method for an apparatus using a tiling optical system that divides a display into three parts, upper, middle, and lower, will be described. The three partial images are adjacent to one another in the vertical direction.

Figure 12:
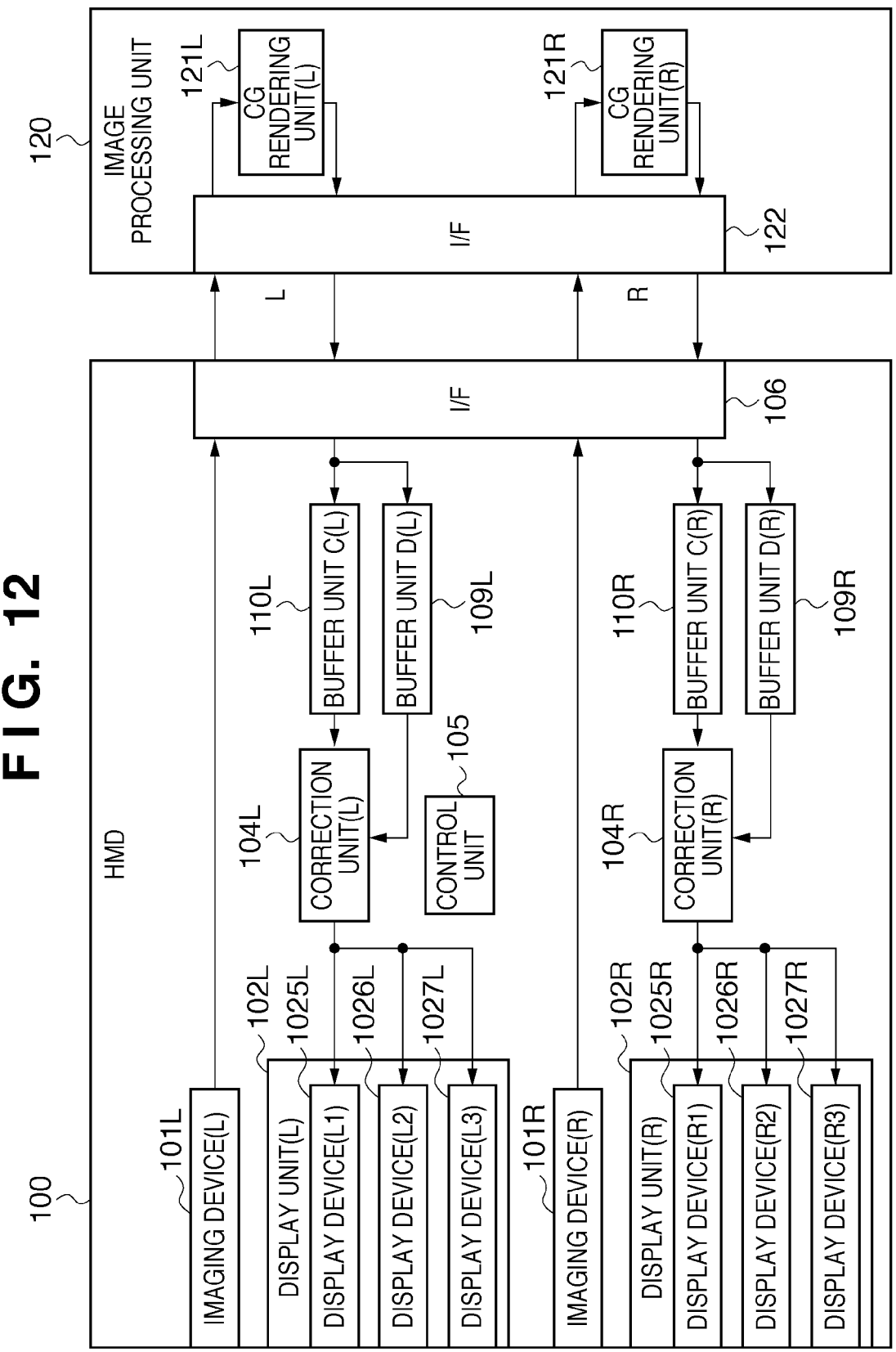
FIG. 12 is a block diagram showing a system configuration of a head mounted image display apparatus (video see-through HMD) according to a third embodiment.
Figure 13:
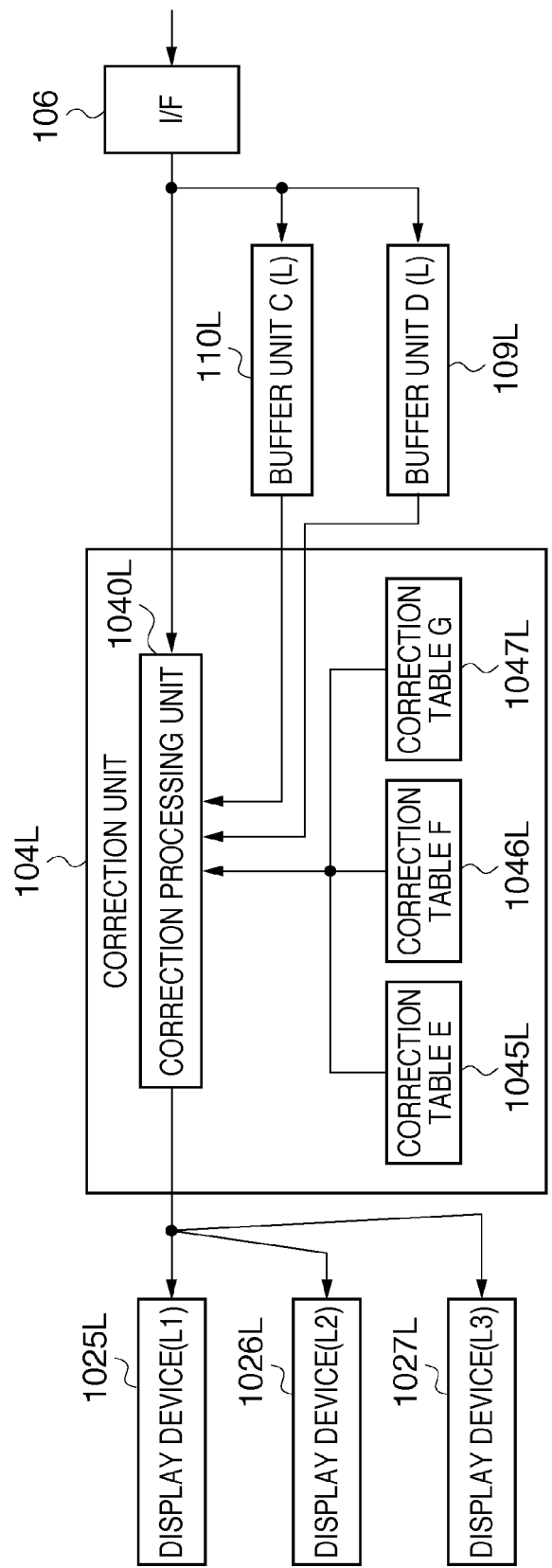
FIG. 13 is a block diagram showing a correction unit and surrounding components according to the third embodiment.

FIG. 12 is a functional block diagram showing a system configuration of a head mounted image display apparatus according to the third embodiment. Since the display is divided into three parts, upper, middle, and lower, one more display device and buffer unit are added for each of the systems for the left and right eyes, compared to the apparatus in FIG. 1. The apparatus of the third embodiment includes display devices 1025 to 1027, buffer units D 109 and buffer units C 110. FIG. 13 is a block diagram showing in detail a correction unit 104L and the previous and subsequent stages in the HMD 100. Comparing to FIG. 2A, one correction table is added. Hence, in total, three correction tables, E 1045L, F 1046L, and G 1047L, are provided. FIG. 13 shows the system for the left eye. Details of the system for the right eye (details of the correction unit 104R and the previous and subsequent stages) are the same.

Figure 14:
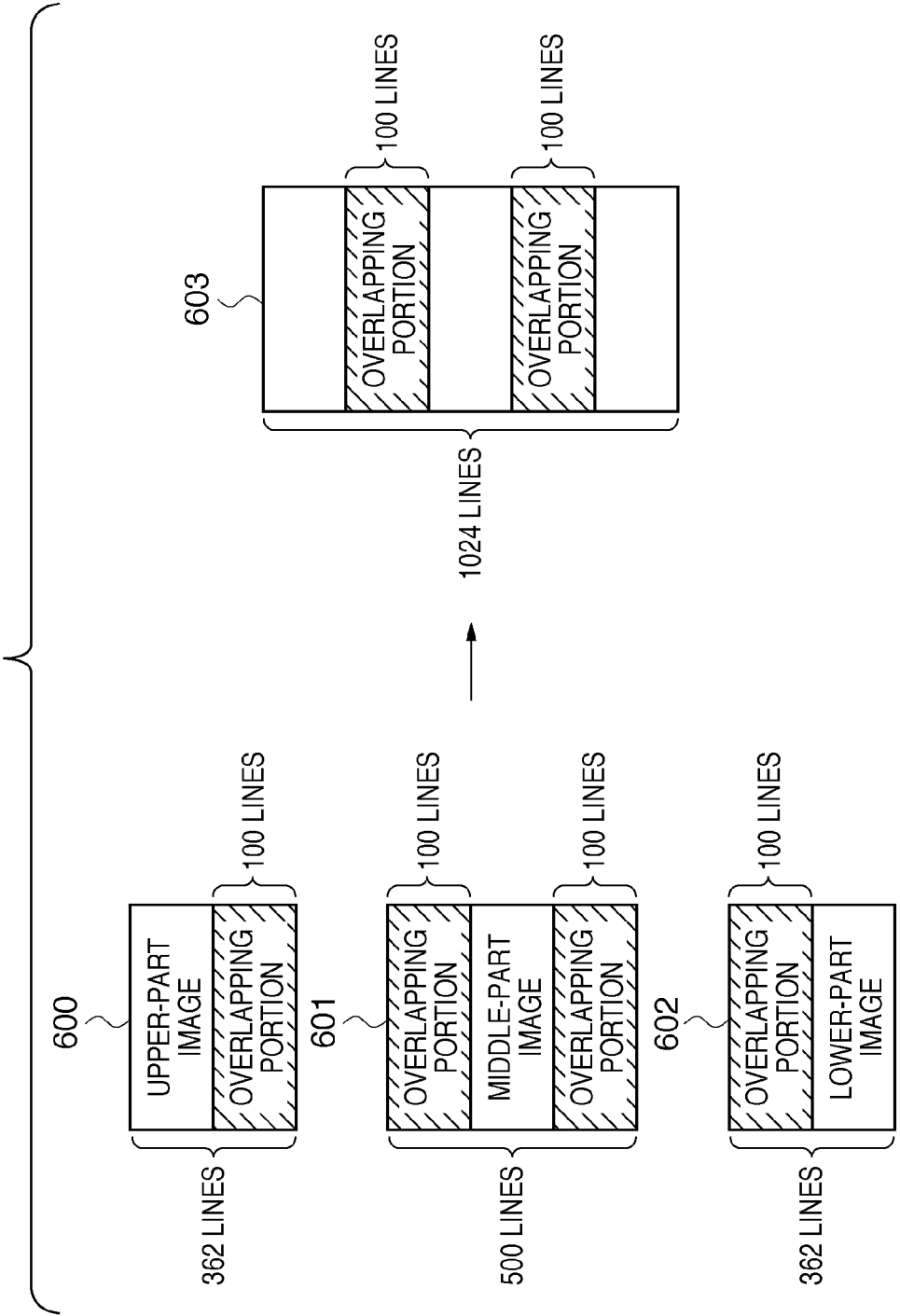
FIG. 14 shows how a display image is divided according to the third embodiment.

FIG. 14 illustrates exemplary images displayed on individual display devices in the third embodiment and an image that can be viewed by a user of the HMD 100. The upper image 600 is displayed on an upper display device 1025L, the middle image 601 is displayed on a middle display device 1026L, and the lower image 602 is displayed on a lower display device 1027L. In FIG. 14, the images 600 and 602 each include 362 lines in the vertical direction and the image 601 includes 500 lines in the vertical direction. The number of lines in a portion in which images displayed on each display device overlap one another is 100. These images are viewed by the user of the HMD 100 as a single image 603 consisting of 1024 lines in the vertical direction. While the images 600 and 602 displayed on the display devices 1025L and 1027L, respectively, include the same number of lines in the vertical direction (362 lines) in FIG. 14, the present embodiment is not limited to this and the images may include different numbers of lines.

An image correction process according to the third embodiment will be described with reference to a flowchart shown in FIG. 15. The term upper image as used in the following description refers to the image including the upper-part image of the image 600 and an overlapping portion of the image 600 in FIG. 14 (the upper-part image is the upper image 600 excluding the overlapping portion). The term middle image refers to the image including the middle-part image of the image 601 and overlapping portions (the middle-part image is the middle image 601 excluding the two overlapping portions). The term lower image refers to the image including the lower-part image of the image 602 and an overlapping portion (the lower-part image is the lower image 602 excluding the overlapping portion).

Figure 15:
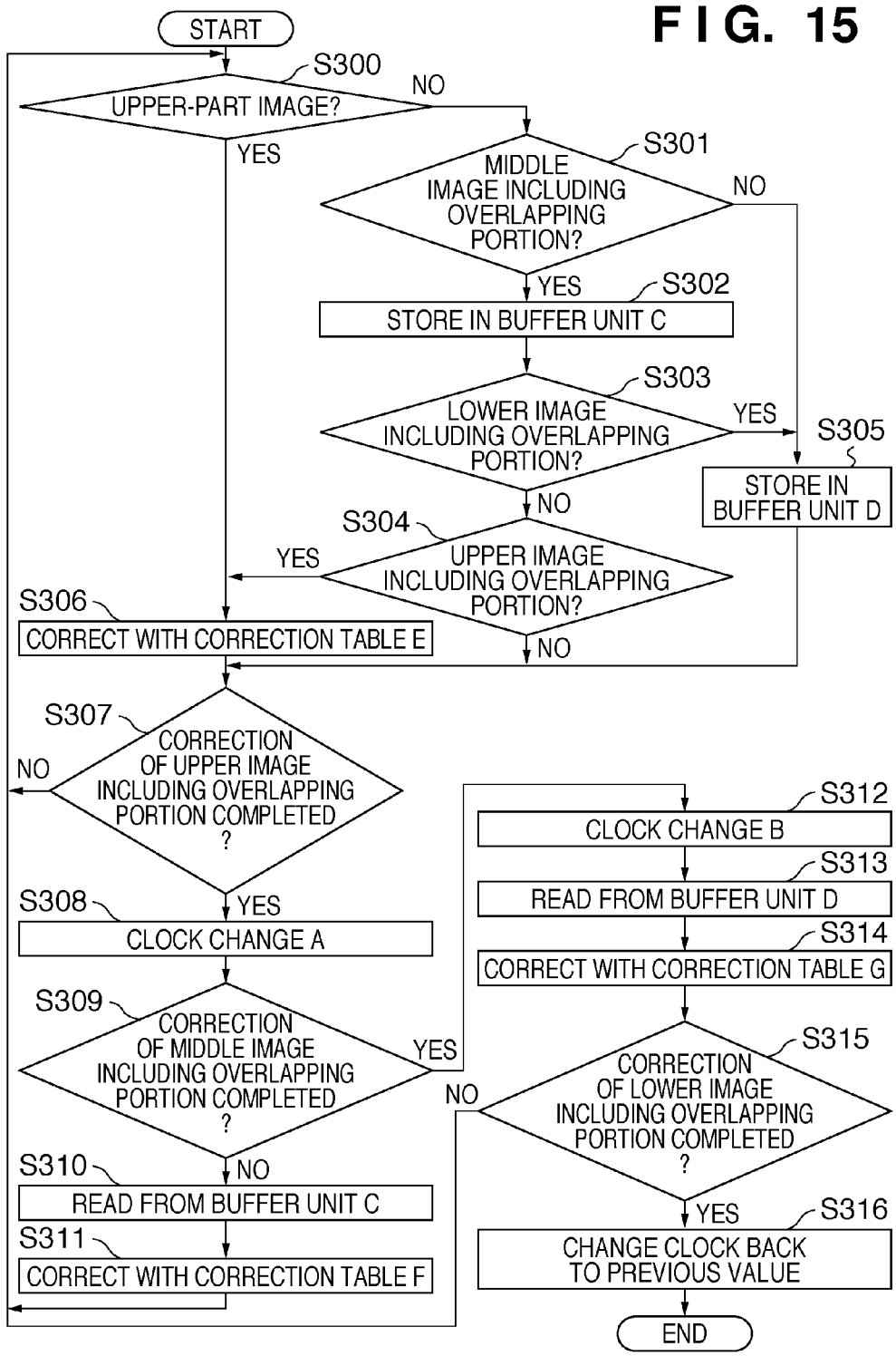
FIG. 15 is a flowchart illustrating a correction process according to the third embodiment.

The process flow in FIG. 15 starts upon reception of the image of one frame and is performed for each line of an image signal. First, the control unit 105 determines in step S300 whether the image received is on a line to be displayed in an upper-part image. If the image received is an upper image, a correction processing unit 1040L corrects the image based on the correction table E 1045 under the control of the control unit 105 in step S306. If it is determined in step S300 that the image is not an upper-part image, the control unit 105 determines in step S301 whether the received image is an image included in a middle image 601 (any of the overlapping portions and the middle-part image). If it is determined that the image is included in the middle image 601, the image is to be displayed on the middle display device 1026L and therefore is stored in a buffer unit C 110L in step S302. Next, in step S303, the control unit 105 determines whether the received image is included in a lower image 602 (any of the overlapping portion of the lower image and the lower-part image). If it is determined that the received image is not included in the lower image 602, the control unit 105 determines in step S304 whether the image is included in the image 600 (any of the overlapping portion of the upper image and the upper-part image). If it is determined that the image is included in the image 600, the image is to be displayed on the upper display device 1025L and therefore the correction unit 104 corrects the image by using the correction table E 1045L in step S306.

The received image is to be displayed on the lower display device 1027L and therefore the control unit 105 stores the received image in a buffer unit D 109L in step S305 when:

it is determined in step S301 that the received image is not included in the middle image 601 (any of the overlapping portions and the middle-part image); or it is determined in step S303 that the received image is included in the lower image 602 (any of the overlapping portion and the lower-part image).

Determination is made in step S307 as to whether correction of the upper image including the overlapping portion has been completed. If it has been completed, the control unit 105 performs a clock change A process in step S308. In the clock change A, the control unit 105 determines whether the clock for the correction processing of the middle image including the overlapping portions needs to be changed. If the clock needs to be changed, the clock is changed. To determine whether the clock needs to be changed and, if so, by how much, the time that can be allocated to correction processing of the image must be determined. For example, the time can be allocated as follows. Of the processing time allocated to correction processing of the image of one frame, the time remaining at the time when the correction processing of the upper image 600 has been completed is divided by the ratio between the number of lines of the middle image 601 and the number of lines of the lower image 602, and the resulting time is allocated to the correction processing. Given the processing time, the clock speed required can be obtained since the amount of processing can be known from the number of lines of the middle image 601. The clock is changed in step S308 for operation at the display device 1026L and the correction unit 104L, between the display device 1026L and the correction unit 104L, and between the correction unit 104L and the buffer unit C 110L.

Determination is made in step S309 as to whether correction of the middle image including the overlapping portions has been completed. If not, the correction unit 104L reads the image from the buffer unit C 110L under the control of the control unit 105 in step S310. Next, in step S311, the correction processing unit 1040L performs correction processing of the image read from the buffer unit C 110L by using the correction table F 1046.

If it is determined in step S309 that the correction of the middle image has been completed, the control unit 105 performs a clock change B process in step S312. The control unit 105 calculates the clock required for completing the correction processing by the end of reception of the image. If the current clock needs to be changed, the control unit 105 sets the calculated clock. The clock is changed in step S312 for operation at the display device 1027L, the correction unit 104L, between the display device 1027L and the correction unit 104L, and between the correction unit 104L and the buffer unit D 109L. The correction unit 104L reads the image from the buffer unit D 109L under the control of the control unit 105 in step S313 and the correction processing unit 1040L performs correction processing of the read image by using the correction table G 1047L in step S314. When it is determined in step S315 that correction of the image of one frame has been completed, the control unit 105 changes the clock back to the previous clock in step S316. While the correction unit 104L reads images from the buffer units C 110L and D 109L in the third embodiment, the embodiment is not limited to this. It will be apparent that a switch unit 201 shown in FIG. 2B may be used to switch access among the I/F 106, buffer unit C 110L, and buffer unit D 109L, for example.

Figure 16A:
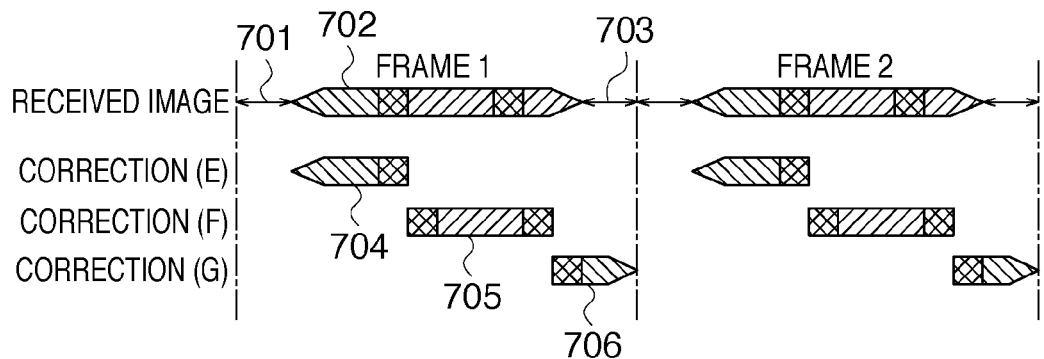
FIGS. 16A to 16D are timing charts of image reception and correction processing according to the third embodiment.
Figure 16B:
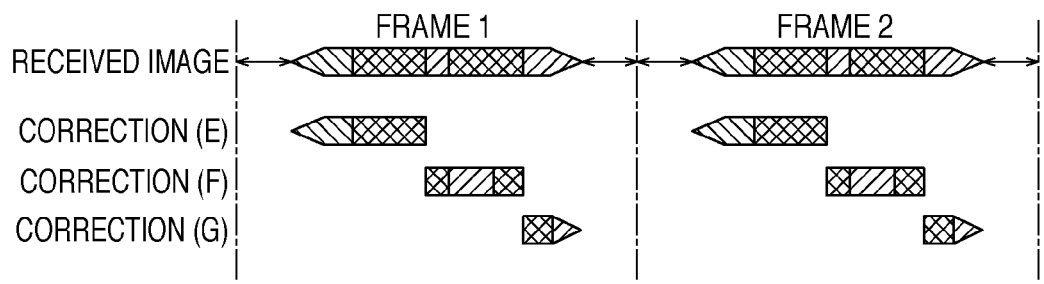
Figure 16C:
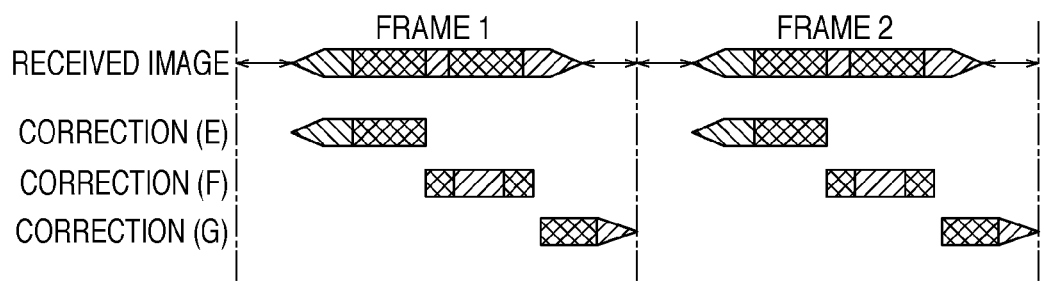
Figure 16D:
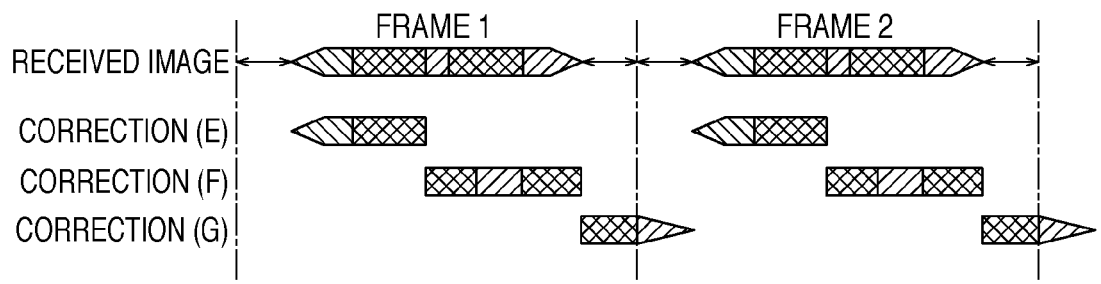

FIGS. 16A to 16D are timing charts of image reception and correction processing according to the process flow of the third embodiment. Reference numeral 701 indicates a front porch, reference numeral 702 indicates the image of one frame, and reference numeral 703 indicates a back porch. Reference numerals 704, 705, and 706 indicate time periods in which correction processes (E), (F), and (G) are being performed, respectively. In the example shown in FIG. 16A, the overlapping portions are small and therefore the clock does not need to be changed. In the example shown in FIG. 16B, on the other hand, the overlapping portions are large and therefore the clock is changed. While the clock is changed so that correction processing is completed approximately at the end of the reception of the image in the processes in FIG. 15 and FIG. 16B, the embodiment is not so limited. For example, the processing clock may be changed so that correction processing is completed by the end of the back porch as shown in FIG. 16C or by the end of the front porch of the next frame as shown in FIG. 16D. It is essential only that the speed of correction processing be changed so that correction of all partial images is completed by the time the image of the next frame is received.

While the third embodiment has been described with respect to an example in which a display is divided into three parts, the same processing method can be applied to a case where a display is divided into four or more parts, the description of which will be omitted.

As has been described above, multiple buffers are provided before correction units which correct images and are used for correction processing in the third embodiment. This configuration requires only one correction unit per eye even though an optical system that divides a display into three or more parts is used, and can display images with low latency.

Fourth Embodiment

In the first to third embodiments, methods for correcting overlapping areas have been described. For example, in the first embodiment, if an image consists of 1024 lines in the vertical direction and each of the upper and lower halves of the image has an overlapping portion consisting of 100 lines, correction processing is applied to 1124 lines. In the fourth embodiment, if an optical system that divides a display into upper and lower parts and each of the upper and lower halves of an image consisting of 1024 lines in the vertical direction has an overlapping portion consisting of 100 lines for example, correction processing is applied to 1024 lines.

Figure 17:
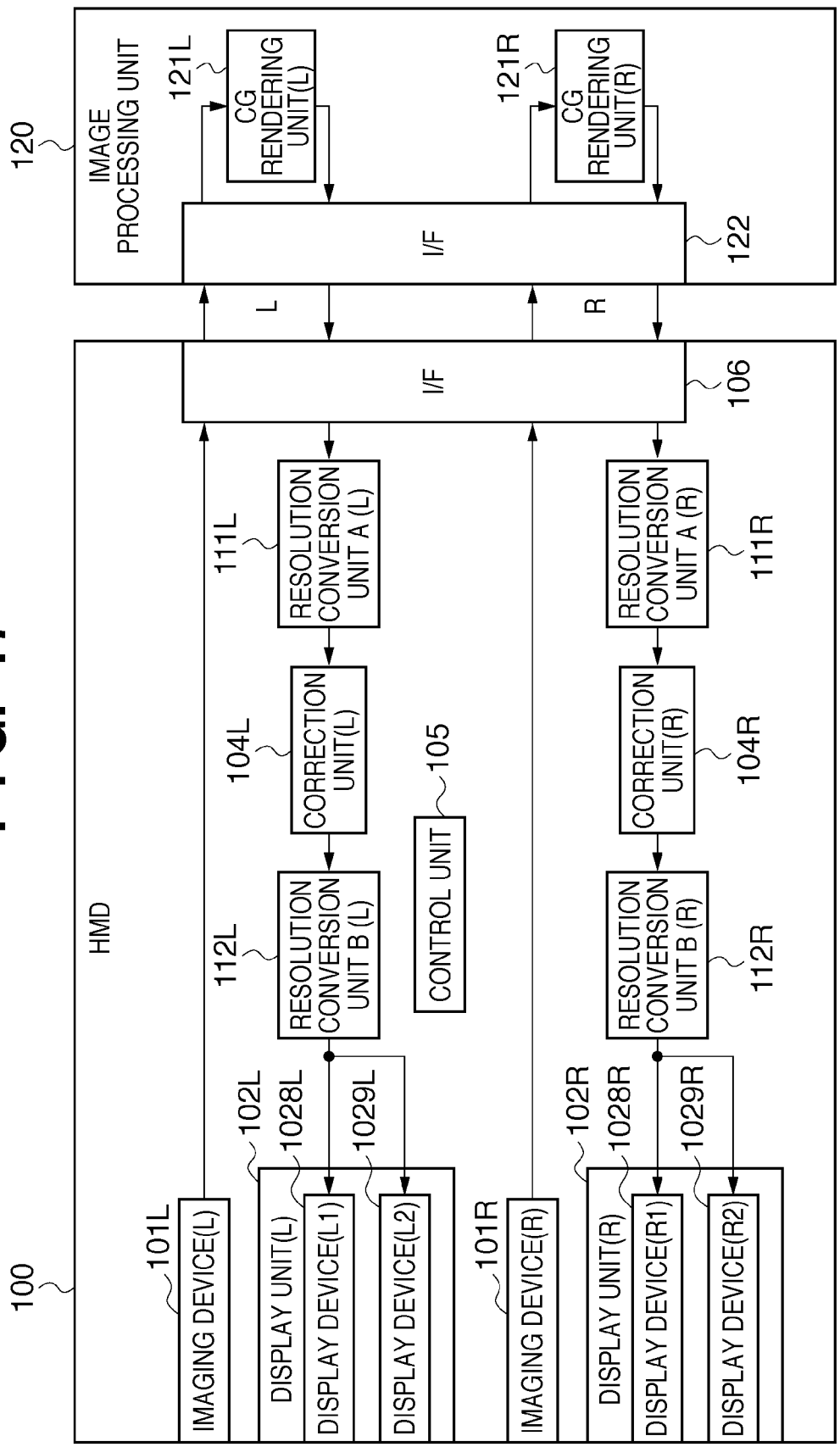
FIG. 17 is a block diagram showing a system configuration of a head mounted image display apparatus (video see-through HMD) according to a fourth embodiment.

FIG. 17 is a functional block diagram showing a system configuration of a head mounted image display apparatus according to the fourth embodiment. Comparing to the apparatus in FIG. 1, resolution conversion units A 111 and B 112 are added to the systems for the left and right eyes. Display devices 1028 display an upper image and display devices 1029 display a lower image.

Figure 19:
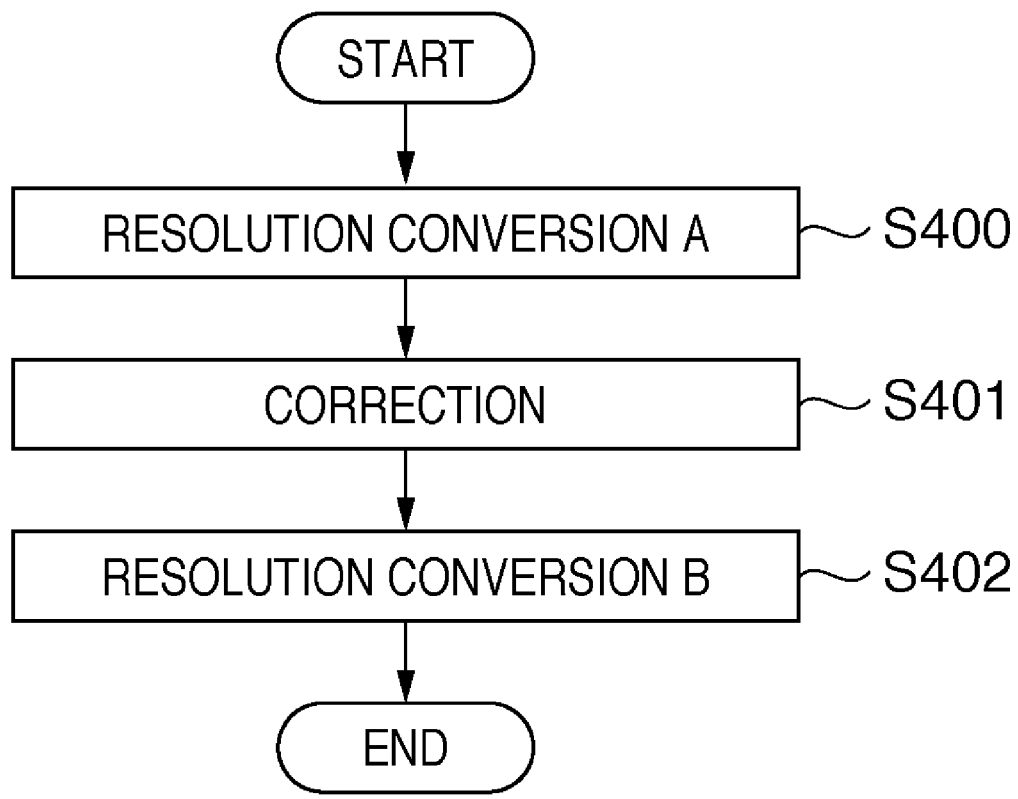
FIG. 19 is a flowchart illustrating a correction process according to the fourth embodiment.
Figure 20:
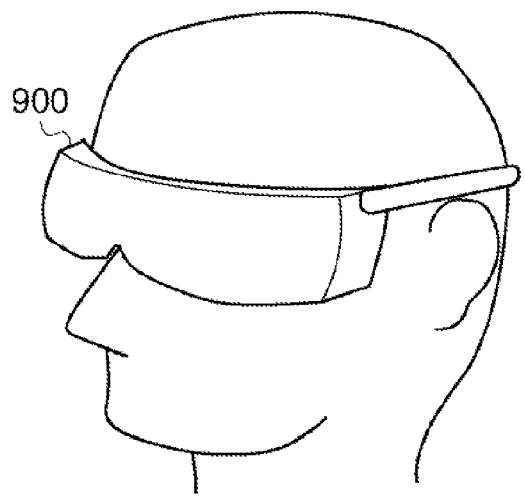
FIG. 20 is a diagram showing an HMD being worn by a user.
Figure 21:
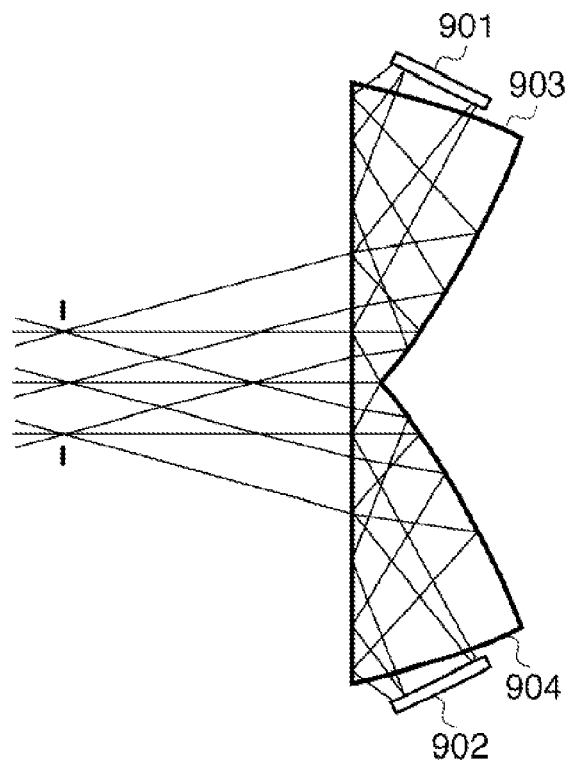
FIG. 21 is a diagram illustrating a tiling optical system.

An image correction process according to the fourth embodiment will be described below with reference to a flowchart shown in FIG. 19. In step S400, the resolution conversion unit A 111 converts the resolution of a received image under the control of the control unit 105. For example, if an image consisting of 1024 lines in the vertical direction includes an overlapping portion consisting of 100 lines, the resolution conversion unit A 111 converts the resolution of the image signal of the 1024-line image so that a total of 1024 lines of image signal are input to the correction unit 104.

Figure 18:
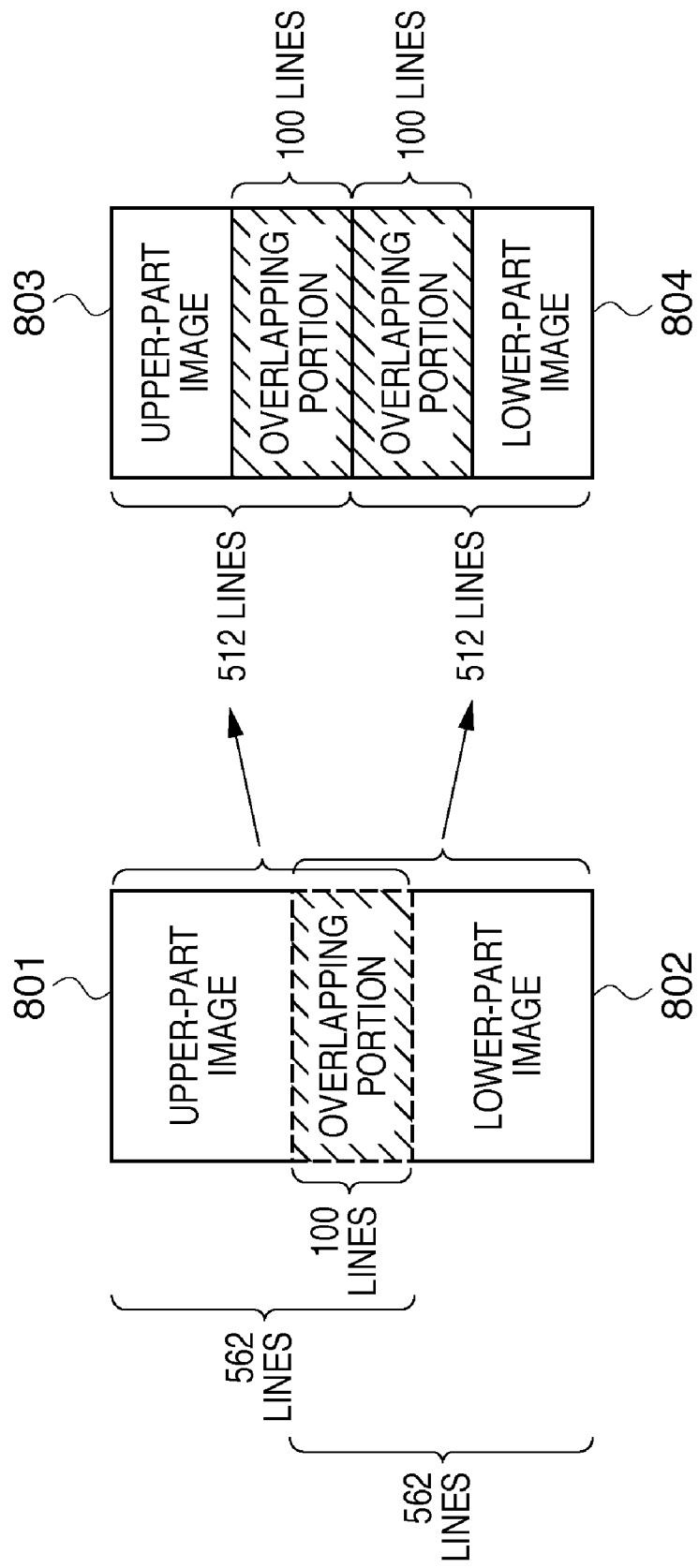
FIGS. 18A and 18B are diagrams illustrating an overview of a correction process according to the fourth embodiment.

FIGS. 18A and 18B show image sizes in this example. FIG. 18A shows a received image consisting of 1024 lines in the vertical direction. An image 801 is to be displayed on a display device 1028 and an image 802 is to be displayed on a display device 1029.

The resolution conversion unit A 111 converts the image as shown in FIG. 18B. The resolution is converted so that the image 801 is converted to an image 803 and the image 802 is converted to an image 804. That is, the images are converted so that the overlapping portion is duplicated and yet the resulting image consists of 1024 lines in the vertical direction.

In the example in FIGS. 18A and 18B, the image needs to be reduced by 100 lines in the vertical direction. Preferably, in the reduction method, only an upper portion of the upper-part image and a lower portion of the lower-part image (the upper and lower end of the image) are reduced because a user of the HMD is likely to fix his or her eyes on the central portion of an image. However, an image may be uniformly reduced in the vertical direction. The image can be reduced by thinning out the lines. In this way, the resolution conversion unit A 111 performs first conversion to convert the resolution of the image signal received so that the total number of lines of partial images becomes equal to the total number of lines of the whole image.

In step S401, the correction unit 104 corrects the images 803 and 804 separately under the control of the control unit 105. Since the images have been reduced in the vertical direction before the correction, the resolution conversion unit B 112 extends the reduced images at step S402. The extension can be accomplished by performing the inverse of the reduction performed at the resolution conversion unit A 111. That is, the resolution conversion unit B 112 performs second conversion to convert the resolution of the corrected image signal so that the number of lines of the whole image becomes equal to the total number of lines of the partial images.

As has been described above, resolution conversion units are provided before and after correction units which correct images in the fourth embodiment. With this configuration, a universal correction circuit can be used because the format of an image to be corrected is the same as that of an image received.

According to the present invention, multiple images into which one image is divided can be corrected by means of a common correction circuit and the latency for displaying the images can be reduced.

The present invention is also achievable in embodiments such as a system, an apparatus, a method, a program, or a storage medium. Specifically, it may also be applied to a system constituted by multiple devices and may also be applied to an apparatus constituted by a single device.

Note that the case where the functionality of the above-mentioned embodiment is achieved by directly or remotely supplying a software program to a system or device and reading out and executing the supplied program code through a computer in the system or device is included in the scope of the present invention. In this case, the supplied program is a computer program that corresponds to the flowchart indicated in the drawings in the embodiment.

Accordingly, the program code itself, installed in a computer so as to realize the functional processing of the present invention through a computer, also realizes the present invention. In other words, the computer program itself for realizing the functional processing of the present invention and a computer readable storage medium storing said computer program, are also included within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-159693, filed Jun. 18, 2008, which is hereby incorporated by reference herein in its entirety.

What is claimed is:

1. An image display apparatus which divides an image into a plurality of partial images, each having a region overlapping an adjacent partial image, and displays each of the plurality of partial images on an associated one of a plurality of displays to allow a viewer to view the partial images displayed on the plurality of displays as a single image, said image display apparatus comprising:
a reception unit configured to receive an image signal corresponding to the image;
a storage unit configured to store the image signal received by said reception unit in a buffer on a partial-image-by-partial-image basis;
a correction unit configured to correct the image signal so that correction appropriate to an optical system of a display associated with each of the plurality of partial images is applied to the partial image; and
a control unit configured to change the speed of correction processing performed by said correction unit for each partial image represented by an image signal stored in the buffer.

2. The image display apparatus according to claim 1, wherein:
said correction unit applies correction processing to the first partial image in a sequence of image signals received by said reception unit in synchronization with the reception by said reception unit; and
said storage unit stores image signals corresponding to the second and subsequent signals in a buffer on a partial-image-by-partial-image basis.

3. The image display apparatus according to claim 1, wherein:
said correction unit performs correction processing of each of sub-regions into which each of the plurality of partial images is divided, adjacent sub-regions having an overlapping region; and
said control unit changes the speed of correction processing performed by said correction unit each time an image signal of each of the plurality of sub-regions is processed.

4. The image display apparatus according to claim 3, wherein said correction unit performs correction processing of the plurality of sub-regions in the order in which reception of image signals corresponding to sub-regions by said reception unit is completed.

5. The image display apparatus according to claim 1, wherein:
said reception unit receives a moving image including a plurality of images of frames; and
said control unit changes the speed of the correction processing so that correction of all of the plurality of partial images is completed by the time an image of the next frame is received.

6. The image display apparatus according to claim 1, wherein said control unit changes the speed of the correction processing by changing a clock speed with which said correction unit operates.

7. The image display apparatus according to claim 1, wherein the correction processing by said correction unit includes at least any one of distortion correction and chromatic aberration correction.

8. A method for controlling an image display apparatus which divides an image into a plurality of partial images, each having a region overlapping an adjacent partial image, and displays each of the plurality of partial images on an associated one of a plurality of displays to allow a viewer to view the partial images displayed on the plurality of displays as a single image, said method comprising the steps of:
receiving an image signal corresponding to the image;
storing the image signal received in said receiving step in a buffer on a partial-image-by-partial-image basis;
correcting the image signal so that correction appropriate to an optical system of a display associated with each of the plurality of partial images is applied to the partial image; and changing the speed of correction processing performed in said correcting step for each partial image represented by an image signal stored in the buffer.

9. A computer-readable storage medium storing a program for causing a computer to perform the method for controlling an image processing apparatus according to claim 8.

* * * * *